US011170937B2

(12) United States Patent
Kanbe et al.

(10) Patent No.: US 11,170,937 B2
(45) Date of Patent: Nov. 9, 2021

(54) MULTILAYER CERAMIC ELECTRONIC COMPONENT

(71) Applicant: Murata Manufacturing Co., Ltd., Nagaokakyo (JP)

(72) Inventors: Shogo Kanbe, Nagaokakyo (JP); Masahiro Andatsu, Nagaokakyo (JP); Kosuke Nakano, Nagaokakyo (JP); Hideki Otsuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 165 days.

(21) Appl. No.: 16/529,881

(22) Filed: Aug. 2, 2019

(65) Prior Publication Data

US 2019/0355522 A1 Nov. 21, 2019

Related U.S. Application Data

(63) Continuation of application No. PCT/IP2018/000556, filed on Jan. 12, 2018.

(30) Foreign Application Priority Data

Feb. 13, 2017 (JP) .............................. JP2017-023960

(51) Int. Cl.
*H01G 4/232* (2006.01)
*H01G 4/30* (2006.01)
(Continued)

(52) U.S. Cl.
CPC .............. *H01G 4/232* (2013.01); *H01G 2/06* (2013.01); *H01G 4/30* (2013.01); *H01G 4/1227* (2013.01); *H01G 4/1236* (2013.01)

(58) Field of Classification Search
CPC ................................ H01G 4/228; H01G 4/232
See application file for complete search history.

(56) References Cited

U.S. PATENT DOCUMENTS 6,431,956 B1 * 8/2002 Otsuka .................... B24B 31/02
451/32
2003/0041427 A1 * 3/2003 Hattori ..................... H01G 4/30
29/25.42

(Continued)

FOREIGN PATENT DOCUMENTS

JP 02-8125 U 1/1990
JP 11-102837 A 4/1999
(Continued)

OTHER PUBLICATIONS

Official Communication issued in International Patent Application No. PCT/JP2018/000556, dated Apr. 3, 2018.

*Primary Examiner* — Eric W Thomas
(74) *Attorney, Agent, or Firm* — Keating & Bennett, LLP

(57) ABSTRACT

A multilayer ceramic electronic component includes a laminate including external electrodes connected to a pair of metal terminals through a bonding material. Each of the pair of metal terminals includes a terminal body, an extension portion, and a mounting portion. The terminal body includes side-surface ribs, opposed to the side surfaces of the electronic component body. The bonding material is provided between the side-surface ribs and the external electrode opposed to the side-surface rib and is not provided between the terminal body and the end surface center portion of the external electrode.

20 Claims, 13 Drawing Sheets

(51) Int. Cl.
*H01G 2/06* (2006.01)
*H01G 4/12* (2006.01)

(56) References Cited

U.S. PATENT DOCUMENTS

| | | | |
|---|---|---|---|
| 2012/0043854 A1* | 2/2012 | Otsuka | H01G 4/30 |
| | | | 310/311 |
| 2012/0326569 A1* | 12/2012 | Itagaki | H01G 4/232 |
| | | | 310/365 |
| 2014/0345927 A1 | 11/2014 | Itagaki | |
| 2016/0260546 A1 | 9/2016 | Mori et al. | |
| 2017/0159154 A1 | 6/2017 | Washizuka | |
| 2017/0316878 A1* | 11/2017 | Peuser | H01G 2/06 |

FOREIGN PATENT DOCUMENTS

| | | |
|---|---|---|
| JP | 11-162780 A | 6/1999 |
| JP | 2000-277376 A | 10/2000 |
| JP | 2004-288847 A | 10/2004 |
| JP | 2008-130954 A | 6/2008 |
| JP | 2012-023322 A | 2/2012 |
| JP | 2014-044977 A | 3/2014 |
| JP | 2015-008270 A | 1/2015 |
| JP | 2016-162938 A | 9/2016 |
| JP | 2016-225380 A | 12/2016 |
| WO | 2016/039057 A1 | 3/2016 |

* cited by examiner

CROSS-SECTIONAL VIEW ON LINE II-II

CROSS-SECTIONAL VIEW ON LINE III-III

CROSS-SECTIONAL VIEW ON LINE IV-IV

CROSS-SECTIONAL VIEW ON LINE VII-VII

CROSS-SECTIONAL VIEW ON LINE VIII-VIII

CROSS-SECTIONAL VIEW
ON LINE IX-IX

FIG. 12A
FIG. 12B
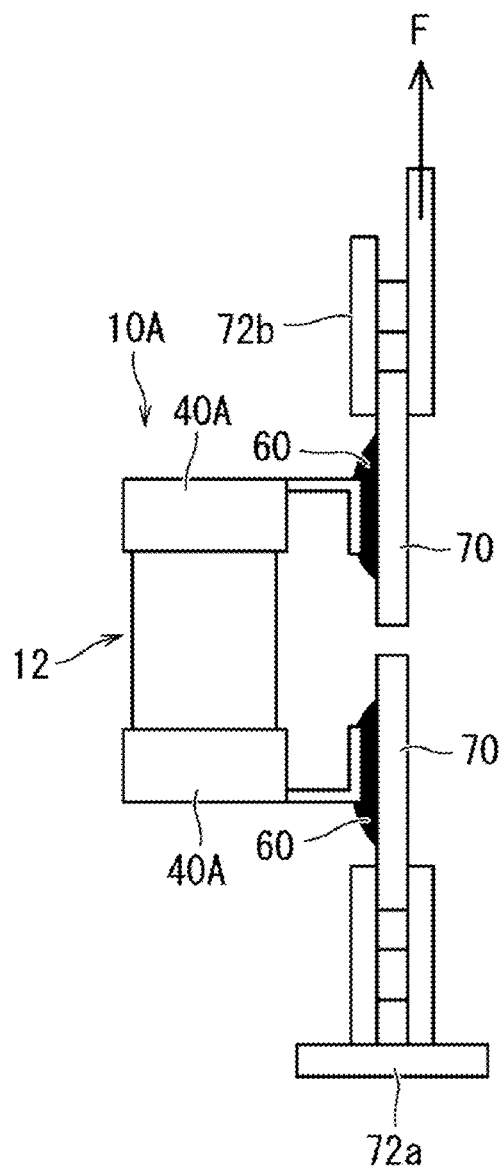
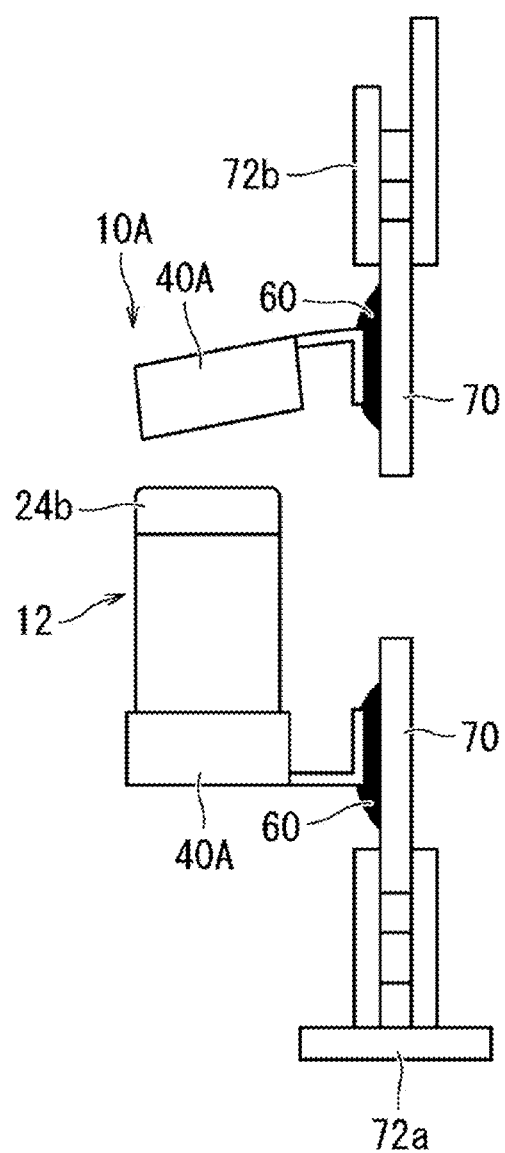

MULTILAYER CERAMIC ELECTRONIC COMPONENT

CROSS REFERENCE TO RELATED APPLICATIONS

This application claims the benefit of priority to Japanese Patent Application No. 2017-023960 filed on Feb. 13, 2017 and is a Continuation Application of PCT Application No. PCT/JP2018/000556 filed on Jan. 12, 2018. The entire contents of each application are hereby incorporated herein by reference.

BACKGROUND OF THE INVENTION

1. Field of the Invention

The present invention relates to a multilayer ceramic electronic component including, for example, a multilayer ceramic capacitor.

2. Description of the Related Art

There have been remarkable advances in technology for reducing the thickness of layers and technology for increasing the number of layers of multilayer ceramic capacitors in recent years. Capacitors having high electrostatic capacitance comparable to those of aluminum electrolytic capacitors have been marketed.

As the ceramic materials for forming the laminates of such multilayer ceramic capacitors, barium titanate and other ferroelectric materials having relatively high dielectric constants are generally used. Such ferroelectric materials, however, have piezoelectric and electrostriction properties, such that stress and mechanical strain are caused when the ferroelectric materials are subjected to an electric field.

Therefore, with the stress and the mechanical strain caused at the time of applying an electric field, the vibration is transmitted from the external electrode of the multilayer ceramic capacitor to the substrate side. As a result, the substrate becomes a sound reflecting surface and a vibration noise (a buzzing sound) is likely to be generated.

In general, high heat is generated around the power source, so that an aluminum substrate is used because it is excellent in heat dissipation. However, temperature largely changes around the power source due to on/off of the power source, so that a large thermal stress is produced in the multilayer ceramic capacitor mounted on the aluminum substrate having a large thermal expansion coefficient. Such thermal stress leads to cracks in the multilayer ceramic capacitor, thus causing problems, such as a short circuit or ignition.

To take measures against such problems, for example, as shown in FIG. 13, it has been considered that a multilayer ceramic electronic component 1 provided by connecting a pair of metal terminals 6 to external electrodes 4 of a multilayer ceramic capacitor (an electronic component body) 2 by solder 6a has a structure in which the metal terminals 6 are soldered to a mounting substrate 8 so that the mounting substrate 7 and the multilayer ceramic capacitor 2 are spaced apart from each other. Such structure is able to absorb a mechanical strain produced in the ceramic layers by applying an AC voltage due to elastic deformation of the metal terminals 6, prevent the vibration from being transmitted to the substrate through the external electrode 4 to thus reduce the occurrence of noise, and further reduce thermal stress from the mounting substrate (see FIGS. 20 to 22 in Japanese Patent Application Laid-Open No. 2004-288847).

In the structure disclosed in Japanese Patent Application Laid-Open No. 2004-288847 (see FIG. 13), however, in the case of generating a void in the inside of the bonding material 6a that bonds the metal terminal 6 and the external electrode 4 or in the case of using such bonding material, sufficient strength against stress (tensile stress) generated in a direction connecting the two metal terminals 6 has not been obtained, for example, by a crack generated in the bonding portion in some cases.

Further, as shown in the structure disclosed in Japanese Patent Application Laid-Open No. 2004-288847 (see FIG. 13), in the case of bonding the external electrodes 4 of the multilayer ceramic capacitor 2 and the metal terminals 6 by the solder 6a, a relatively large amount of Sn remains in the bonding portions between the external electrodes 4 and the metal terminals 6. Therefore, when exposed to a high temperature environment for onboard use or the like, the metal in the plating layer in the external electrodes 4 (including a base electrode layer and a plating layer) is diffused to the base electrode layer. As a result of this, the plating layer disappears and the bonding strength between the external electrodes 4 and the metal terminals 6 decreases with time, which may generate a structural defect, such as a crack, in the bonding portion between the external electrodes 4 and the metal terminals 6.

SUMMARY OF THE INVENTION

Preferred embodiments of the present invention provide multilayer ceramic electronic components that are each capable of ensuring sufficient strength against stress generated in the direction connecting the metal terminals.

A multilayer ceramic electronic component according to a preferred embodiment of the present invention includes a laminate including a plurality of dielectric layers and a plurality of internal electrode layers alternately stacked, a first principal surface and a second principal surface that are opposite to each other in a laminating direction, a first side surface and a second side surface that are opposite to each other in a width direction orthogonal or substantially orthogonal to the laminating direction, and a first end surface and a second end surface that are opposite to each other in a length direction orthogonal or substantially orthogonal to both the laminating direction and the width direction y; an electronic component body including a first external electrode connected to the first end surface of the laminate and a second external electrode connected to the second end surface of the laminate; a first metal terminal connected to the first external electrode through a bonding material; and a second metal terminal connected to the second external electrode through a bonding material, in which the first metal terminal includes a terminal body opposed to the first end surface; an extension portion connected to the terminal body and extending in a direction of a mounting surface; and a mounting portion connected to the extension portion and extending from the extension portion in a direction connecting the end surfaces, the second metal terminal includes a terminal body opposed to the second end surface; an extension portion connected to the terminal body and extending in a direction of a mounting surface; and a mounting portion connected to the extension portion and extending from the extension portion in a direction connecting the end surfaces, in the first metal terminal and the second metal terminal, the extension portion provides a gap between a lower surface of the electronic component body and the mounting portion, a rib extending so as to be opposed to the side surface of the electronic component body is provided on the terminal body, the bonding material is provided between the rib of the first metal terminal and the first external electrode opposed to the rib, and not provided between the terminal body and an end surface center portion of the first external electrode, the bonding material is provided at least between the rib of the second metal terminal and the second external electrode opposed to the rib, and not provided between the terminal body and an end surface center portion of the second external electrode.

It is preferable that a multilayer ceramic electronic component according to a preferred embodiment of the present invention further includes a rib extending so as to be opposed to a principal surface of the electronic component body in the terminal bodies of the first metal terminal and the second metal terminal.

In a multilayer ceramic electronic component according to a preferred embodiment of the present invention, it is preferable that the bonding material includes a Cu-M (M is Ni, Mn, Al, or Cr) alloy; an intermetallic compound including at least two kinds of Cu, Ni, Mn, Al, Cr, Sn, Au, Ag, Sb, Zn, and Bi; and Sn, and a Sn ratio in the bonding material is about 5% or less.

Further, in a multilayer ceramic capacitor according to a preferred embodiment of the present invention, it is preferable that the bonding material extends to a surface of the laminate from the first external electrode opposed to the rib of the first metal terminal, and the bonding material extends to a surface of the laminate from the first external electrode opposed to the rib of the second metal terminal.

In a multilayer ceramic electronic component according to a preferred embodiment of the present invention, the ribs that extend so as to be opposed to the respective side surfaces of the electronic component body are provided on the terminal body of the metal terminal, the bonding material that is provided between the ribs of the first metal terminal and the first external electrode that is opposed to the ribs is used for bonding, and the bonding material is not provided between the terminal body of the first metal terminal and the end surface center portion of the first external electrode, and similarly, the bonding material that is provided between the ribs of the second metal terminal and the second external electrode that is opposed to the ribs is used for bonding, and the bonding material is not provided between the terminal body of the second metal terminal and the end surface center portion of the second external electrode. Therefore, even the bonding material that is weak in tension is able to ensure sufficient strength against stress (tensile stress) generated in the direction connecting the two metal terminals by acting as shearing force that has relatively high strength.

In addition, in a multilayer ceramic electronic component according to a preferred embodiment of the present invention, the ribs extending so as to be opposed to the respective principal surfaces of the electronic component body are further provided on the terminal body of the metal terminal, the bonding material that is provided between the ribs extending so as to be opposed to the respective principal surfaces of the electronic component body and the first external electrode is used for bonding, and similarly, the bonding material that is provided between the ribs extending so as to be opposed to the respective principal surfaces of the electronic component body and the second external electrode is used for bonding. Therefore, further sufficient strength against stress (tensile stress) generated in the direction connecting the two metal terminals is able to be ensured.

Further, in a multilayer ceramic electronic component according to a preferred embodiment of the present invention, the bonding material includes about 5% or less of Sn that causes diffusion, and a metal and an intermetallic compound having a melting point of about 260° C. or higher, so that a diffused metal species is substantially not provided therein and variations in its interface structure are small under a high temperature environment at about 200° C. or higher. This prevents a problem that, even under a high temperature environment, the bonding strength between the external electrode and the metal terminal decreases over time, causing a structural defect, such as a crack, in the bonding portion of the external electrode and the metal terminal.

Furthermore, in a multilayer ceramic electronic component according to a preferred embodiment of the present invention, the bonding material is disposed over a portion of the surface of the first external electrode disposed on the first end surface side of the laminate from the first external electrode opposed to the ribs of the first metal terminal, and the bonding material is also disposed over a portion of the surface of the second external electrode disposed on the second end surface side of the laminate from the second external electrode opposed to the ribs of the second metal terminal. Therefore, the bonding strength between the metal terminals and the external electrodes is increased.

According to preferred embodiments of the present invention, multilayer ceramic electronic components that are each capable of ensuring sufficient strength against stress generated in the direction connecting the metal terminals are obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11A shows a state in which the multilayer ceramic electronic component is mounted on a mounting substrate; and FIG. 11B shows a state in which the mounting substrate is cut into right and left portions.

FIGS. 12A and 12B show performance steps for evaluation of the peel strength test; FIG. 12A shows a state in which both ends of the mounting substrate are held with jigs (a fixing jig and a tensile jig); and FIG. 12B shows a state in which the mounting substrate is pulled with the tensile jig.

DETAILED DESCRIPTION OF THE PREFERRED EMBODIMENTS

Preferred embodiments of the present invention will be described below in detail with reference to the drawings.

1. Multilayer Ceramic Electronic Component

First Preferred Embodiment

Figure 1:
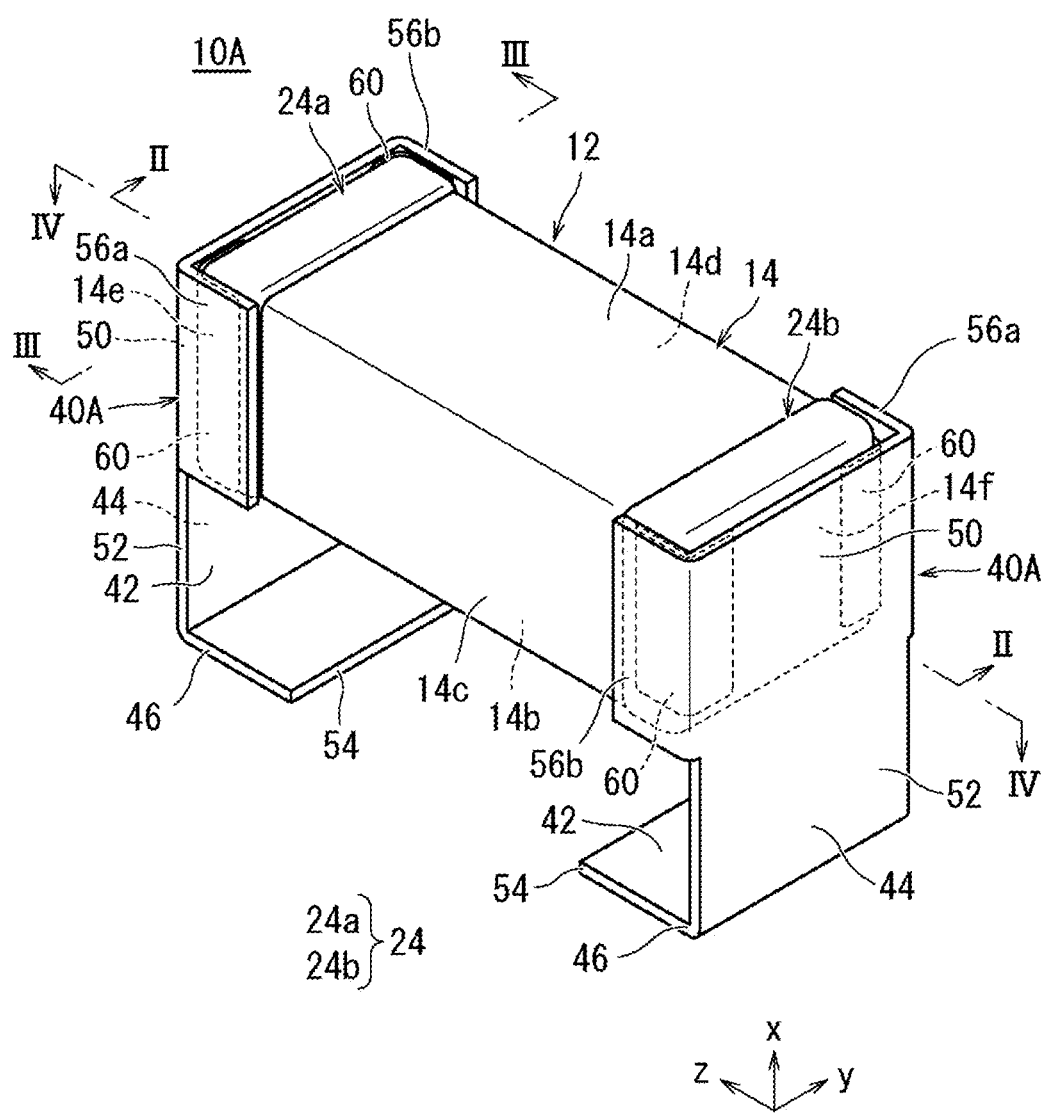
FIG. 1 is a perspective view of an external appearance showing an example of a multilayer ceramic electronic component according to a first preferred embodiment of the present invention.
Figure 2:
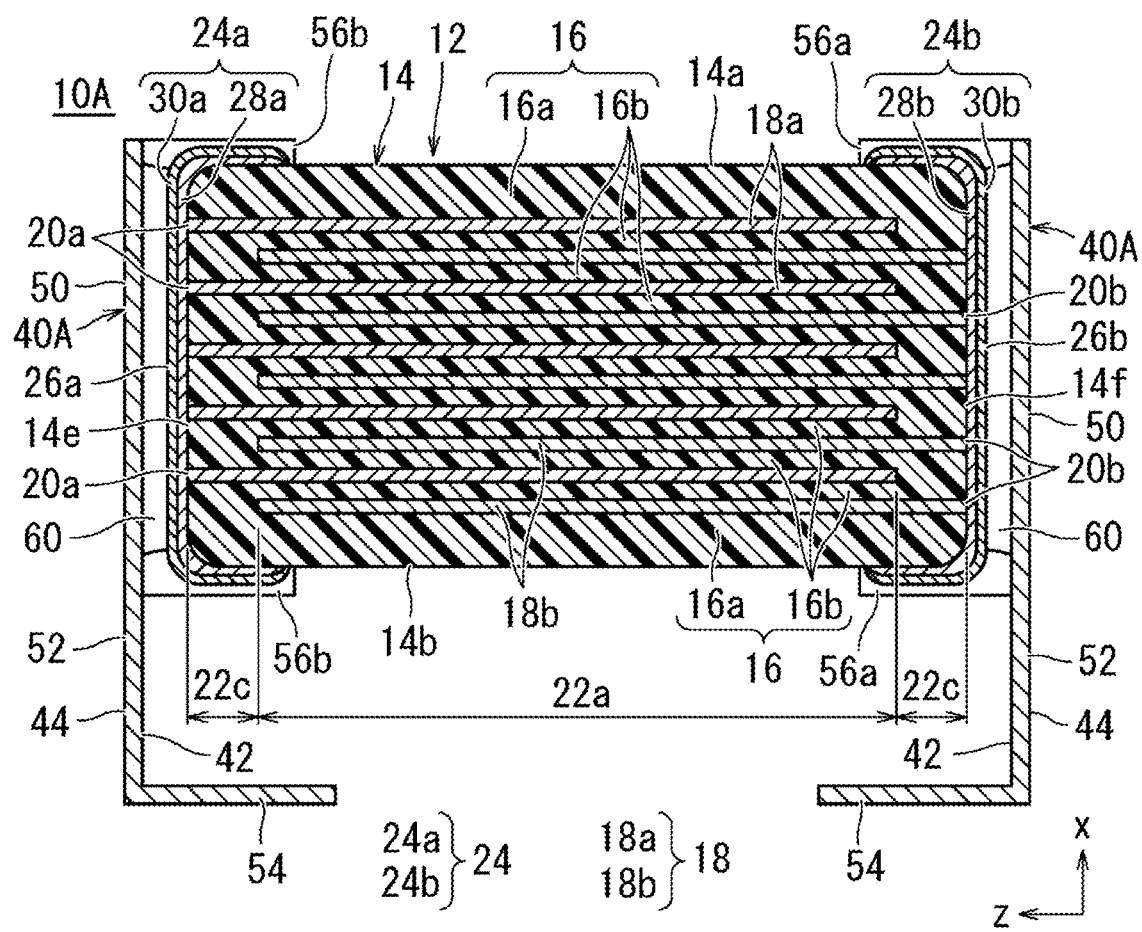
FIG. 2 is a cross-sectional view taken along the line II-II in FIG. 1 showing the multilayer ceramic electronic component according to the first preferred embodiment of the present invention.
Figure 3:
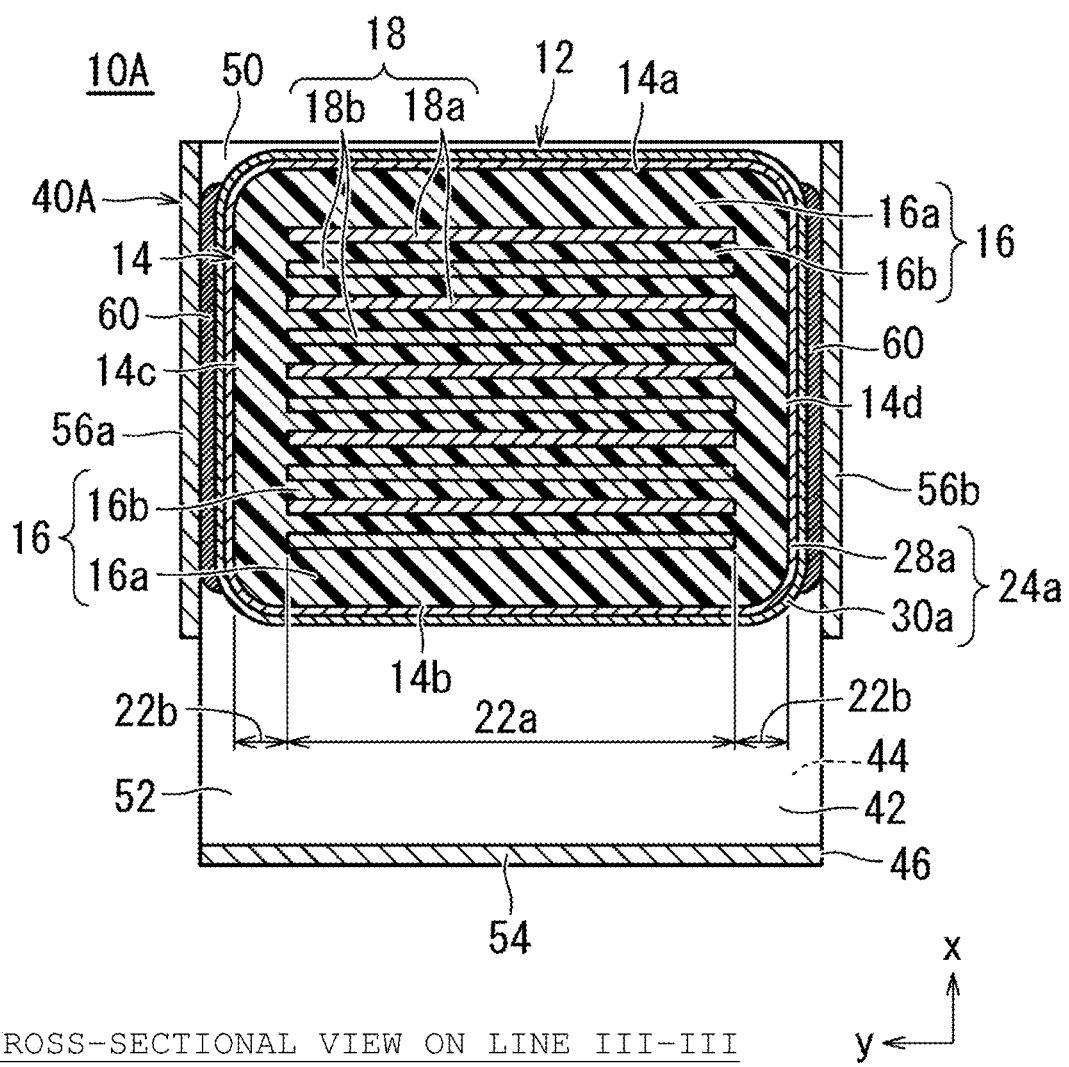
FIG. 3 is a cross-sectional view taken along the line III-III in FIG. 1 showing the multilayer ceramic electronic component according to the first preferred embodiment of the present invention.
Figure 4:
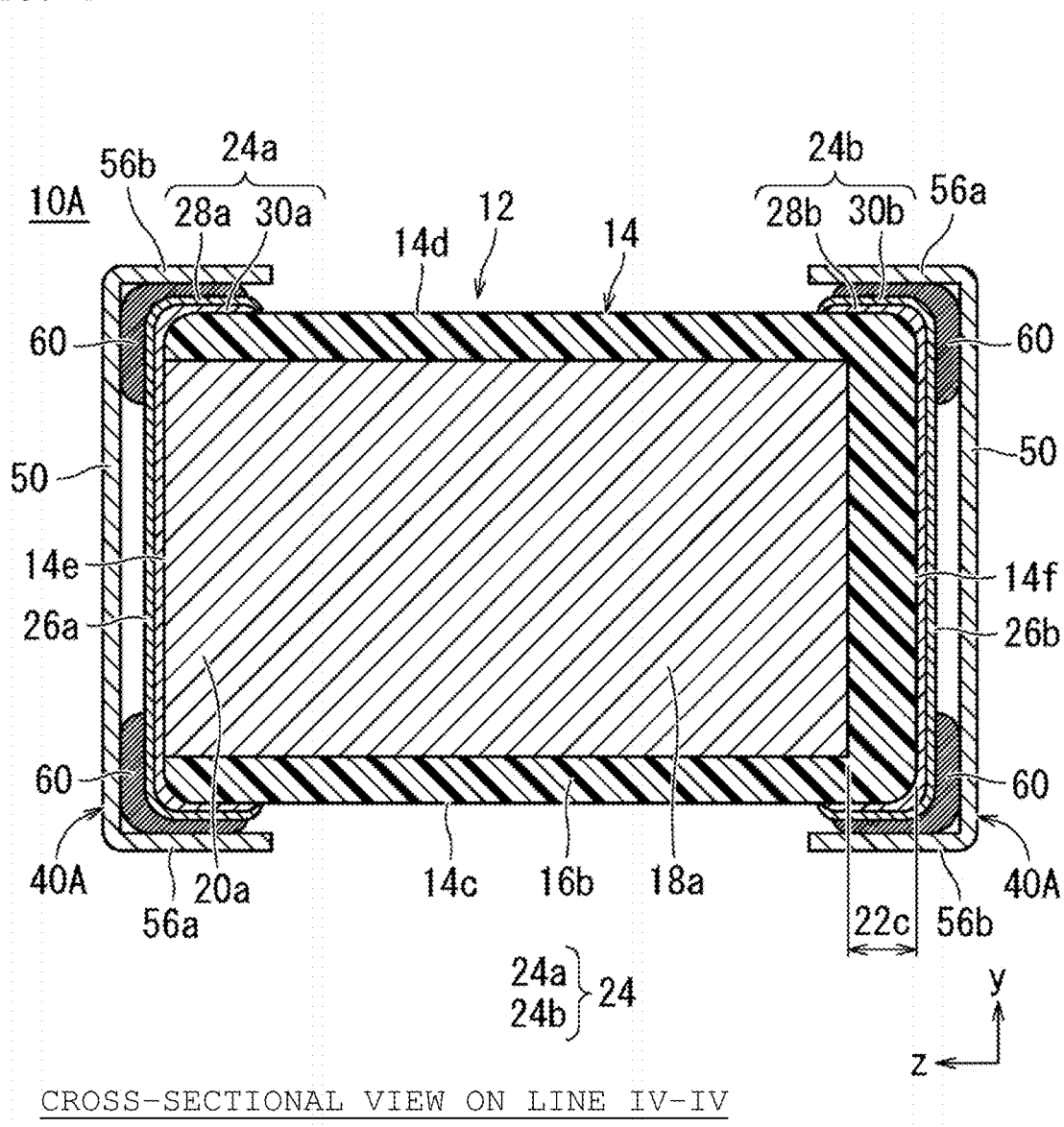
FIG. 4 is a cross-sectional view taken along the line IV-IV in FIG. 1 showing the multilayer ceramic electronic component according to the first preferred embodiment of the present invention.
Figure 5:
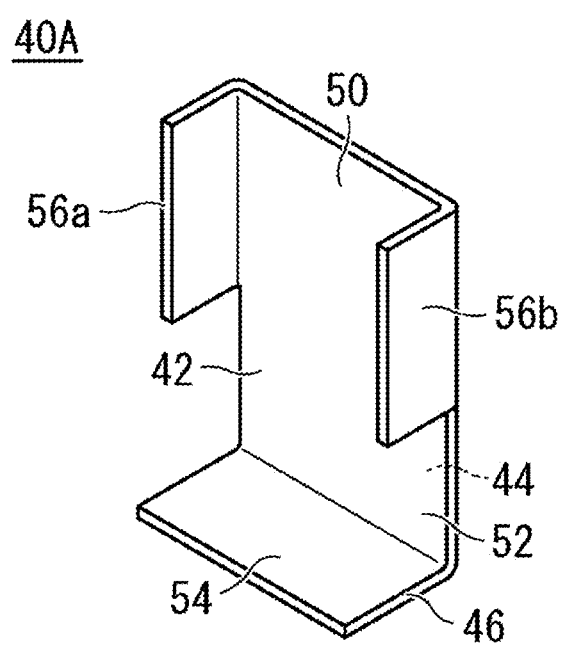
FIG. 5 is a perspective view of an external appearance showing a metal terminal included in the multilayer ceramic electronic component according to the first preferred embodiment of the present invention.

A multilayer ceramic electronic component according to a first preferred embodiment of the present invention will be described below. FIG. 1 is a perspective view of an external appearance showing an example of the multilayer ceramic electronic component according to the first preferred embodiment of the present invention. FIG. 2 is a cross-sectional view taken along the line II-II in FIG. 1 showing the multilayer ceramic electronic component according to the first preferred embodiment of the present invention, and FIG. 3 is a cross-sectional view taken along the line in FIG. 1 showing the multilayer ceramic electronic component according to the first preferred embodiment of the present invention. FIG. 4 is a cross-sectional view taken along the line IV-IV in FIG. 1 showing the multilayer ceramic electronic component according to the first preferred embodiment of the present invention. FIG. 5 is a perspective view of an external appearance showing a metal terminal included in the multilayer ceramic electronic component according to the first preferred embodiment of the present invention.

As shown in FIGS. 1 and 2, a multilayer ceramic electronic component 10 includes, for example, an electronic component body 12 and a pair of metal terminals 40A. The electronic component body 12 and the pair of metal terminals 40A are connected through a bonding material 60.

The electronic component body 12 includes a laminate 14 preferably having a rectangular or substantially rectangular parallelepiped shape.

The laminate 14 includes a plurality of ceramic layers 16 and a plurality of internal electrode layers 18 that are stacked. In addition, the laminate 14 includes a first principal surface 14a and a second principal surface 14b that are opposite to each other in a laminating direction x, a first side surface 14c and a second side surface 14d that are opposite to each other in a width direction y orthogonal or substantially orthogonal to the laminating direction x, and a first end surface 14e and a second end surface 14f that are opposite to each other in a length direction z orthogonal or substantially orthogonal to both the laminating direction x and the width direction y. Preferably, corners and ridges of the laminate 14 are rounded. Here, the corner refers to a portion at which three adjacent surfaces of the laminate meet, and the ridge refers to a portion at which two adjacent surfaces of the laminate meet.

The ceramic layer 16 includes an outer layer portion 16a and an inner layer portion 16b. The outer layer portion 16a is a ceramic layer 16 located on the first principal surface 14a side and the second principal surface 14b side of the laminate 14, and located between the first principal surface 14a and the internal electrode layer 18 closest to the first principal surface 14a, and is a ceramic layer 16 located between the second principal surface 14b and the internal electrode layer 18 closest to the second principal surface 14b. A region sandwiched between both of the outer layer portions 16a is the inner layer portion 16b.

The ceramic layer 16 may preferably be made of a dielectric material, for example. As the dielectric material, a dielectric ceramic including a component such as $BaTiO_3$, $CaTiO_3$, $SrTiO_3$, or $CaZrO_3$ may preferably be used, for example. When the above-described dielectric material is included as a main component, a dielectric ceramic to which a Mn compound, a Fe compound, an Cr compound, a Co compound, a Ni compound, or other suitable compound, is added as a component with a content less than that of the main component, in accordance with desired characteristics of the electronic component body 12, for example, may preferably be used.

In the case of using a piezoelectric ceramic in the laminate 14, the electronic component body defines and functions as a ceramic piezoelectric element. Specific examples of the piezoelectric ceramic material include a PZT (lead zirconate titanate) based ceramic material and the like.

In the case of using a semiconductor ceramic in the laminate 14, the electronic component body defines and functions as a thermistor element. Specific examples of the semiconductor ceramic material include a spinel-based ceramic material and the like.

In the case of using a magnetic ceramic in the laminate 14, the electronic component body defines and functions as an inductor element. When the electronic component body defines and functions as an inductor element, the internal electrode layers 18 are replaced with a coil-shaped conductor. Specific examples of the magnetic ceramic material include a ferrite ceramic material and the like.

The fired ceramic layer 16 preferably has a thickness of about 0.5 μm or more and about 10 μm or less, for example.

As shown in FIG. 2, the laminate 14 includes, for example, a plurality of first internal electrode layers 18a and a plurality of second internal electrode layers 18b, each preferably having a rectangular or substantially rectangular shape, as the plurality of internal electrode layers 18. The plurality of first and second internal electrode layers 18a, 18b are embedded so as to be alternately disposed at equal or substantially equal distances along the laminating direction x of the laminate 14.

The electrode surfaces of the first and second internal electrode layers 18a, 18b are disposed perpendicular or substantially perpendicular to a direction in which the metal terminal 40A extends and disposed in parallel or substantially parallel to a mounting surface.

A first extended electrode portion 20a that extends to the first end surface 14e of the laminate 14 is included on one end side of the first internal electrode layer 18a. A second extended electrode portion 20b that extends to the second end surface 14f of the laminate 14 is included on one end side of the second internal electrode layer 18b. Specifically, the first extended electrode portion 20a on one end side of the first internal electrode layer 18a is exposed to the first end surface 14e of the laminate 14. The second extended electrode portion 20b on one end side of the second internal electrode layer 18b is exposed to the second end surface 14f of the laminate 14. The internal electrode 18 may be disposed so as to be in parallel or substantially parallel to or perpendicular or substantially perpendicular to the mounting surface.

The laminate 14 includes an opposed electrode portion 22a in which the first internal electrode layers 18a and the second internal electrode layers 18b are opposite to each other in the inner layer portions 16b of the ceramic layers 16. The laminate 14 includes a side portion (hereinafter referred to as W gap) 22b of the laminate 14 that is provided between one end of the opposed electrode portion 22a in the width direction y and the first side surface 14c and between the other end of the opposed electrode portion 22a in the width direction y and the second side surface 14d. Further, the laminate 14 includes an end portion (hereinafter referred to as L gap) 22c of the laminate 14 that is provided between an end portion opposite to the first extended electrode portion 20a of the first internal electrode layer 18a and the second end surface 14f and between an end portion opposite to the second extended electrode portion 20b of the second internal electrode layer 18b and the first end surface 14e.

The internal electrode layer 18 preferably contains metal such as Ni, Cu, Ag, Pd, or Au, or alloy including one of these metals, such as Ag—Pd alloy, for example. The internal electrode layer 18 may further include dielectric grains with the same or substantially the same composition base as that of the ceramic included in the ceramic layer 16.

The internal electrode layer 18 preferably has a thickness of about 0.1 µm or more and about 2 µm or less, for example.

An external electrode 24 is disposed on each of the first end surface 14e side and the second end surface 14f side of the laminate 14. The external electrode 24 includes a first external electrode 24a and a second external electrode 24b.

The first external electrode 24a is disposed on the surface of the first end surface 14e of the laminate 14, and extends from the first end surface 14e to cover a portion of each of the first principal surface 14a, the second principal surface 14b, the first side surface 14c, and the second side surface 14d. In this case, the first external electrode 24a is electrically connected to the first extended electrode 20a of the first internal electrode 18a.

The second external electrode 24b is disposed on the surface of the second end surface 14f of the laminate 14, and extends from the second end surface 14f to cover a portion of each of the first principal surface 14a, the second principal surface 14b, the first side surface 14c, and the second side surface 14d. In this case, the second external electrode 24b is electrically connected to the second extended electrode 20b of the second internal electrode layer 18b.

When the first internal electrode layer 18a and the second internal electrode layer 18b in each opposed electrode portion 22a face each other with the ceramic layer 16 interposed therebetween in the laminate 14, electrostatic capacitance is generated. Thus, electrostatic capacitance is able to be obtained between the first external electrode 24a to which the first internal electrode layers 18a are connected, and the second external electrode 24b to which the second internal electrode layers 18b are connected. As a result, the electronic component body having the structure as described above defines and functions as a capacitor element.

As shown in FIG. 2, the first external electrode 24a includes a first base electrode layer 28a and a first plating layer 30a disposed on the surface of the first base electrode layer 28a in order from the laminate 14 side. Similarly, the second external electrode 24b includes a second base electrode layer 28b and a second plating layer 30b disposed on the surface of the second base electrode layer 28b in order from the laminate 14 side.

The first base electrode layer 28a is disposed on the surface of the first end surface 14e of the laminate 14, and extends from the first end surface 14e to cover a portion of each of the first principal surface 14a, the second principal surface 14b, the first side surface 14c, and the second side surface 14d.

The second base electrode layer 28b is disposed on the surface of the second end surface 14f of the laminate 14, and extends from the second end surface 14f to cover a portion of each of the first principal surface 14a, the second principal surface 14b, the first side surface 14c, and the second side surface 14d.

The first base electrode layer 28a and the second base electrode layer 28b each preferably include at least one layer selected from a baked layer, a thin film layer, and other layers, for example. Here, the first base electrode layer 28a and the second base electrode layer 28b made of the baked layer will be described.

The baked layer includes glass and metal. The metal of the baked layer preferably includes at least one selected from Cu, Ni, Ag, Pb, Ag—Pb alloy, and Au, for example. The glass of the baked layer preferably includes at least one selected from B, Si, Ba, Mg, Al, Li, and Zn. The baked layer may include a plurality of layers. The baked layer is formed by applying a conductive paste including glass and metal to the laminate 14 and then baking the conductive paste. The baked layer may be fired at the same time with the ceramic layer 16 and the internal electrode layer 18, or may be baked after the ceramic layer 16 and the internal electrode layer 18 are fired. The thickness of the thickest portion of the baked layer is preferably about 10 µm or more and about 50 µm or less, for example.

A resin layer including conductive particles and a thermosetting resin may be provided on the surface of the baked layer. The resin layer may be directly provided on the laminate 14 without forming the baked layer. The resin layer may include a plurality of layers. The thickness of the thickest portion of the resin layer is preferably about 10 µm or more and about 150 µm or less, for example.

Further, the thin film layer preferably has a thickness of about 1 µm or less, for example, which is formed by a thin film forming method, such as sputtering method or vapor deposition method, for example, and including metal particles deposited thereon.

The first plating layer 30a covers the first base electrode layer 28a. Specifically, the first plating layer 30a is disposed on the first end surface 14e of the surface of the first base electrode layer 28a, and is preferably provided so as to extend to the first principal surface 14a and the second principal surface 14b of the surface of the first base electrode layer 28*a*, and the first side surface 14*c* and the second side surface 14*d* of the surface of the first base electrode layer 28*a*.

Similarly, the second plating layer 30*b* covers the second base electrode layer 28*b*. Specifically, the second plating layer 30*b* is disposed on the second end surface 14*f* of the surface of the second base electrode layer 28*b*, and is preferably provided so as to extend to the first principal surface 14*a* and the second principal surface 14*b* of the surface of the second base electrode layer 28*b*, and the first side surface 14*c* and the second side surface 14*d* of the surface of the second base electrode layer 28*b*.

As the first plating layer 30*a* and the second plating layer 30*b* (hereinafter simply referred to as a plating layer), for example, at least one metal selected from Cu, Ni, Sn, Ag, Pd, Ag—Pd alloy, and Au, or an alloy containing the metal may preferably be used.

The plating layer may include a plurality of layers. In this case, the plating layer preferably has a bilayer structure including a Ni plating layer and a Sn plating layer, for example. By providing the Ni plating layer so as to cover the surface of the base electrode layer, the Ni plating layer prevents the base electrode layer from being eroded by the solder used when the base electrode layer is bonded to the metal terminal 40A. Also, by providing the Sn plating layer on the surface of the Ni plating layer, the wettability of the solder used for mounting when the multilayer ceramic capacitor is mounted is improved, and thus, the multilayer ceramic capacitor is able to be easily mounted.

The thickness of one plating layer is preferably about 1 μm or more and about 15 μm or less, for example. Preferably, the plating layer does not include glass. Further, the metal content per unit volume of the plating layer is preferably, for example, about 99% by volume or more.

The pair of metal terminals 40A as shown in FIG. 5 are connected to the first external electrode 24*a* and the second external electrode 24*b* of the electronic component body 12 through the bonding material 60. The pair of metal terminals 40A are provided to mount the multilayer ceramic electronic component 10 on a mounting substrate.

For example, a plate-shaped lead frame is preferably used as the pair of metal terminals 40A. The pair of metal terminals 40A defined by the plate-shaped lead frame include one principal surface 42 that is opposed to the first external electrode 24*a* or the second external electrode 24*b*, the other principal surface 44 (the surface on the opposite side of the electronic component body 12) that is opposed to one principal surface 42, and a peripheral surface 46 that defines a thickness between one principal surface 42 and the other principal surface 44. The pair of metal terminals 40A defined by the plate-shaped lead frame each preferably have an L-shaped cross section, for example. Thus, when the pair of metal terminals 40A have an L-shaped cross section, it is possible to improve resistance to deflection of the mounting substrate when the multilayer ceramic electronic component 10 is mounted on the mounting substrate.

The metal terminal 40A includes, for example, a terminal body 50 having a rectangular or substantially rectangular plate shape; an extension portion 52 that is connected to the terminal body 50 and extends from the terminal body 50 towards the mounting surface; a mounting portion 54 that is connected to the extension portion 52 and extends from the extension portion 52 in a direction connecting the first end surface 14*e* and the second end surface 14*f*. With this configuration, the metal terminal 40A is interposed between the electronic component body 12 and the mounting substrate, so that thermal shock is able to be less likely to be applied to the electronic component body 12. Even though stress due to temperature change or deformation of the mounting substrate occurs, it is able to be advantageously absorbed by elastic deformation of the metal terminal 40A.

The terminal body 50 of the metal terminal 40A is a portion located opposite the first end surface 14*e* or the second end surface 14*f* of the electronic component body 12. The terminal bodies 50 of the metal terminals 40A have, for example, a rectangular plate shape with the same or substantially the same width as the first external electrode 24*a* or the second external electrode 24*b* of the electronic component body 12, and one principal surface 42 side of one metal terminal 40A is located opposite the first external electrode 24*a* while one principal surface 42 side of the other metal terminal 40A is located opposite the second external electrode 24*b*.

Side-surface ribs 56*a*, 56*b* that are opposed to the side surfaces 14*c*, 14*d*, respectively, of the electronic component body 12 are provided on the terminal body 50 of the metal terminal 40A. Specifically, the side-surface ribs 56*a*, 56*b* of the metal terminal 40A are provided in portions from the upper end portions of both end sides of the terminal body 50 in the width direction y to portions that do not extend to the mounting portion 54, and extend in a direction connecting the first end surface 14*e* and the second end surface 14*f* of the laminate 14. That is, the side-surface ribs 56*a*, 56*b* are folded at a right angle from both end sides of the terminal body 50 in the width direction y toward the electronic component body 12 side. The side-surface ribs 56*a*, 56*b* of the metal terminal 40A preferably have a length in the length direction z (a length in a direction extending in the direction connecting the first end surface 14*e* and the second end surface 14*f* of the laminate 14) longer than the length in the length direction z of the external electrode 24 that is provided on each of the surfaces of both principal surfaces 14*a*, 14*b* and both side surfaces 14*c*, 14*d* of the laminate 14. In other words, the side-surface ribs 56*a*, 56*b* of the metal terminal 40A preferably cover the external electrode 24 provided on the surfaces of both principal surfaces 14*a*, 14*b* and both side surfaces 14*c*, 14*d* of the laminate 14. Thus, the concentration of thermal stress is reduced and the occurrence of a crack in the electronic component body 12 is significantly reduced or prevented.

The extension portion 52 of the metal terminal 40A is provides a gap between the lower surface (the second principal surface 14*b*) of the electronic component body 12 and the mounting portion 54. The extension portion 52 of the metal terminal 40A isolates the electronic component body 12 from the mounting substrate, and is a portion that extends until it contacts the mounting substrate. Thus, when an AC voltage is applied due to elastic deformation of the metal terminal 40A, the mechanical strain produced in the ceramic layer 16 is able to be absorbed, and the vibration is prevented from being transmitted to the mounting substrate through the external electrode 24. As a result of this, the generation of noise (a buzzing sound) is reduced or prevented. In addition, the extension portion 52 reduces thermal stress generated in the mounting substrate, which can prevent occurrence of a crack in the electronic component body 12. Therefore, a failure, such as a short circuit or ignition, is able to be prevented.

The extension portion 52 of the metal terminal 40A preferably has, for example, a rectangular or substantially rectangular plate shape, extends from the terminal body 50 toward the mounting surface in a height direction orthogonal or substantially orthogonal to the second principal surface 14b of the laminate 14, and is disposed in a plane with the terminal body 50.

The mounting portion 54 of the metal terminal 40A extends from the end of the extension portion 52 of the metal terminal 40A in the length direction z in parallel or substantially in parallel to the second principal surface 14b, and is folded so as to be perpendicular or substantially perpendicular to the extension portion 52 of the metal terminal 40A. The mounting portion 54 of the metal terminal 40A is also folded toward the extension portion of the metal terminal 40A so as to be in contact with the mounting substrate. As the folding direction, the mounting portion 54 may be folded on the electronic component body 12 side or on the side opposite thereto.

The mounting portion 52 of the metal terminal 40A may be formed so as to have a length in the length direction z (the direction connecting both end surfaces 14e, 14f of the laminate 14) longer than the length in the length direction z (the direction connecting both end surfaces 14e, 14f of the laminate 14) of the external electrode 24 that is formed on the second principal surface 14b (on the mounting surface side) of the laminate 14. Thus, at the time of mounting the multilayer ceramic electronic component 10 on the mounting substrate, when the multilayer ceramic electronic component 10 is recognized from below as an image with a camera to detect the position of the component, it is possible to prevent the external electrode 24 of the electronic component body 12 from being incorrectly recognized as the metal terminal 40A, and thus, a detection error is able to be prevented.

The mounting portion 54 of the metal terminal 40A may have a length in the length direction z (the direction connecting both end surfaces 14e, 14f of the laminate 14) longer than the length in the laminating direction x (the direction connecting both principal surfaces 14a, 14b of the laminate 14) of the extension portion 52 of the metal terminal 40A. A corner where the extension portion 52 of the metal terminal 40A and the mounting portion 54 of the metal terminal 40A meet may be rounded.

The metal terminal 40A includes a terminal body and a plating film provided on the surface of the terminal body.

The terminal body is preferably made of, for example, Ni, Fe, Cu, Ag, Cr, or an alloy containing at least one of these metals as a main component. The terminal body is more preferably made of, for example, Ni, Fe, Cu, Cr, or an alloy containing at least one of these metals as a main component. Specifically, for example, a Fe-42Ni alloy or Fe-18Cr alloy can be used as the metal in the base material of the terminal body. The terminal body of the metal terminal 40A preferably has a thickness of about 0.05 mm or more and about 0.5 mm or less, for example. When the terminal body is made of a high-melting point Ni, Fe, Cr, or an alloy containing at least one of these metals as a main component, heat resistance of the external electrode 24 is improved.

Here, the plating film may preferably be provided all over the surface of the metal terminal 40A. The plating film may not be provided on the extension portion 52 of the metal terminal 40A and the peripheral surface 46 of the mounting portion 54. Thus, when the multilayer ceramic electronic component 10 is mounted on the mounting substrate using solder, solder wetting-up to the metal terminal 40A is reduced or prevented. Therefore, solder wetting-up between the electronic component body 12 and the metal terminal 40A (float portion) is reduced or prevented, so that it is possible to prevent solder from being filled in the float portion. Accordingly, a space in the float portion is sufficiently secured. This easily causes elastic deformation of the extension portion 52 of the metal terminal 40A, so that mechanical strain produced in the ceramic layer 16 due to application of an AC voltage is able to be further absorbed. Thus, it is possible to reduce or prevent the transmission of the vibration caused to the mounting substrate through the external electrode 24. Therefore, providing the metal terminal 40A is able to more stably reduce or prevent the generation of acoustic noise (a buzzing sound).

In the case of removing the plating film provided on the surface of the metal terminal 40A or the plating film provided on the extension portion 52 of the metal terminal 40A and the peripheral surface 46 of the mounting portion 54, mechanical removing (cutting, polishing), laser trimming, use of release agent (e.g., sodium hydroxide), or the like is considered as the removal method. Alternatively, for example, when the plating film is not provided on the extension portion 52 of the metal terminal 40A and the surface of the mounting portion 54, the following method may be used: A portion where a plating film is not provided is previously covered with a resist, and a plating film is provided on the other portion of the metal terminal 40A, and the resist is then removed. The plating film may not be provided on the entire peripheral surface of the metal terminal 40A.

The plating film preferably includes, for example, a lower layer plating film and an upper layer plating film.

The lower layer plating film is provided on the surface of the terminal body, and the upper layer plating film is provided on the surface of the lower layer plating film.

The lower layer plating film is preferably made of, for example, Ni, Fe, Cu, Ag, Cr, or an alloy containing at least one of these metals as a main component. The lower layer plating film is more preferably made of, for example, Ni, Fe, Cr, or an alloy containing at least one of these metals as a main component. When the lower layer plating film is made of a high-melting point Ni, Fe, Cr, or an alloy containing at least one of these metals as a main component, heat resistance of the external electrode 24 is improved. The lower layer plating film preferably has a thickness of about 0.2 μm or more and about 5.0 μm or less, for example. The lower layer plating film may include a plurality of plating films.

The upper layer plating film is preferably made of, for example, Sn, Ag, Au, or an alloy containing at least one of these metals as a main component. The upper layer plating film is more preferably made of, for example, Sn or an alloy containing Sn as a main component. When the upper layer plating film is made of Sn or an alloy containing Sn as a main component, solderability of the metal terminal 40A and the external electrode 24 is improved. The upper layer plating film preferably has a thickness of about 1.0 μm or more and about 5.0 μm or less, for example. The upper layer plating film may include a plurality of films.

In the case of providing one layer as the plating film, an upper layer plating film having good solderability is preferably provided.

The bonding material 60 is used to bond between the first external electrode 24a and a bonding portion of one metal terminal 40A and to bond between the second external electrode 24b and a bonding portion of the other metal terminal 40A.

The bonding material 60 is provided between the side-surface ribs 56a, 56b of one metal terminal 40A and the first external electrode 24a (the first external electrode 24a on both side surfaces 14c, 14d) opposed to the side-surface ribs 56a, 56b, and the bonding material 60 is not provided between the terminal body 50 of one metal terminal 40A and the end surface center portion 26a of the first external electrode 24a. Further, the bonding material 60 is provided between the side-surface ribs 56a, 56b of the other metal terminal 40A and the second external electrode 24b (the second external electrode 24b on both side surfaces 14c, 14d) opposed to the side-surface ribs 56a, 56b, and the bonding material 60 is not provided between the terminal body of the other metal terminal 40A and the end surface center portion 26b of the second external electrode 24b.

The bonding material 60 is preferably disposed over a portion of the surface of the first external electrode 24a disposed on the first end surface 14e side of the laminate 14 from the first external electrode 24a opposed to the side-surface ribs 56a, 56b of one metal terminal 40A. Further, the bonding material 60 is preferably disposed over a portion of the surface of the second external electrode 24b disposed on the second end surface 14f side of the laminate 14 from the second external electrode 24b opposed to the side-surface ribs 56a, 56b of the other metal terminal 40A.

Further, the bonding material 60 is preferably disposed over a portion of the surfaces of the first side surface 14c and the second side surface 14d of the laminate 14 from the first external electrode 24a opposed to the side-surface ribs 56a, 56b of one metal terminal 40A (not shown). The bonding material 60 is preferably disposed over a portion of the surfaces of the first side surface 14c and the second side surface 14d of the laminate 14 from the second external electrode 24b opposed to the side-surface ribs 56a, 56b of the other metal terminal 40A (not shown). Thus, the bonding strength between one metal terminal 40A and the first external electrode 24a, and the bonding strength between the other metal terminal 40A and the second external electrode 24b are further increased.

As the bonding material 60, for example, a conductive adhesive in which conductive powders, such as metal powders, are added to a solder or a resin component, such as silicon resin or epoxy resin, may preferably be used. In particular, a conductive material having the following characteristics is preferably used for connection.

The conductive material contains a metal component including a first metal, and a second metal that has a higher melting point than the first metal and is allowed to react with the first metal to provide an intermetallic compound. The first metal of the conductive material is preferably, for example, Sn or an alloy containing about 70% by mass of Sn, and the second metal thereof is preferably, for example, Cu or at least one selected from a Cu—Mn alloy, a Cu—Ni alloy, a Cu—Al alloy, and a Cu—Cr alloy. The first and second metals of the conductive material form an intermetallic compound exhibiting a melting point of about 310° C. or higher. The conductive material also includes materials (e.g., metals such as Ag, Au, etc.) which easily wet the first metal melted as the second metal, and which have their surfaces coated with a metal or an alloy which does not reduce or prevent the reaction between the first metal and the second metal by diffusing in the first metal without remaining on its surface.

Preferably, the bonding material 60 (bonding portion) includes, for example, a metal, an alloy, an intermetallic compound, and Sn or a Sn-based alloy, having a melting point of about 260° C. or higher, or includes a Cu-M (M is Ni, Mn, Al, or Cr) alloy, an intermetallic compound including at least two kinds of Cu, Ni, Mn, Al, Cr, Sn, Au, Ag, Sb, Zn, Bi, and the like, and Sn, and a Sn ratio in the bonding material 60 is about 5% or less. This reduces or prevents a problem that, even under a high temperature environment, the bonding strength between an external electrode and a metal terminal decreases over time, causing a structural defect, such as a crack, in the bonding portion of the external electrode 24 and the metal terminal 40A.

According to a multilayer ceramic electronic component 10A of the first preferred embodiment, the side-surface ribs 56a, 56b that extend so as to be opposed to the side surfaces 14c, 14d, respectively, of the electronic component body 12 are provided on the terminal body 50 of the metal terminal 40A, the bonding material 60 that is provided between the side-surface ribs 56a, 56b of one metal terminal 40A and the first external electrode 24a (the first external electrode 24a on both side surfaces 14c, 14d) is used for bonding, and the bonding material 60 is not provided between the terminal body 50 of one metal terminal 40A and the end surface center portion 26a of the first external electrode 24a; and similarly, the bonding material 60 that is provided between the side-surface ribs 56a, 56b of the other metal terminal 40A and the second external electrode 24b (the second external electrode 24b on both side surfaces 14c, 14d) is used for bonding, and the bonding material 60 is not provided between the terminal body 50 of the other metal terminal 40A and the end surface center portion 26b of the second external electrode 24b. Therefore, even the bonding material 60 that is weak in tension is able to ensure sufficient strength against stress (tensile stress) generated in the direction connecting the two metal terminals 40A by acting as shearing force that has relatively high strength.

In addition, according to the multilayer ceramic electronic component 10A of the first preferred embodiment, the bonding material 60 includes about 5% or less of Sn that causes diffusion, a metal and an intermetallic compound, having a melting point of about 260° C. or higher, so that a diffused metal species are substantially not provided therein and variations in its interface structure is small under a high temperature environment at about 200° C. or higher. This reduces or prevents a problem that, even under a high temperature environment, the bonding strength between an external electrode and a metal terminal decreases over time, causing a structural defect, such as a crack, in the bonding portion of the external electrode 24 and the metal terminal 40A.

Further, according to the multilayer ceramic electronic component 10A of the first preferred embodiment, since the bonding material 60 is disposed over a portion of the surface of the first external electrode 24a disposed on the first end surface 14e side of the laminate 14 from the first external electrode 24a opposed to the side-surface ribs 56a, 56b of one metal terminal 40A, and the bonding material 60 is also disposed over a portion of the surface of the second external electrode 24b disposed on the second end surface 14f side of the laminate 14 from the second external electrode 24b opposed to the side-surface ribs 56a, 56b of the other metal terminal 40A, the bonding strength between the metal terminals 40A and the external electrodes 24 is increased.

Second Preferred Embodiment

Figure 6:
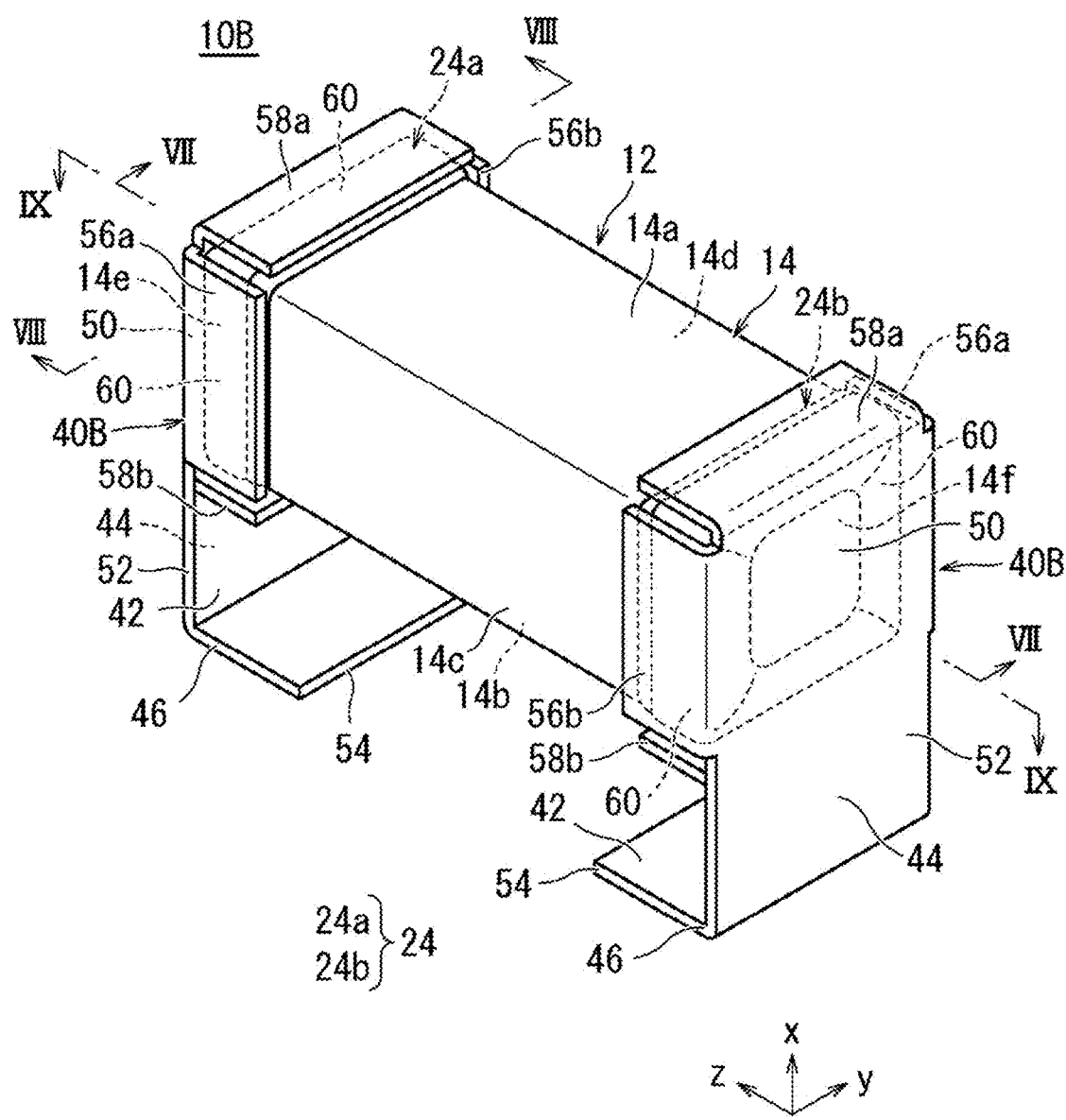
FIG. 6 is a perspective view of an external appearance showing an example of a multilayer ceramic electronic component according to a second preferred embodiment of the present invention.
Figure 7:
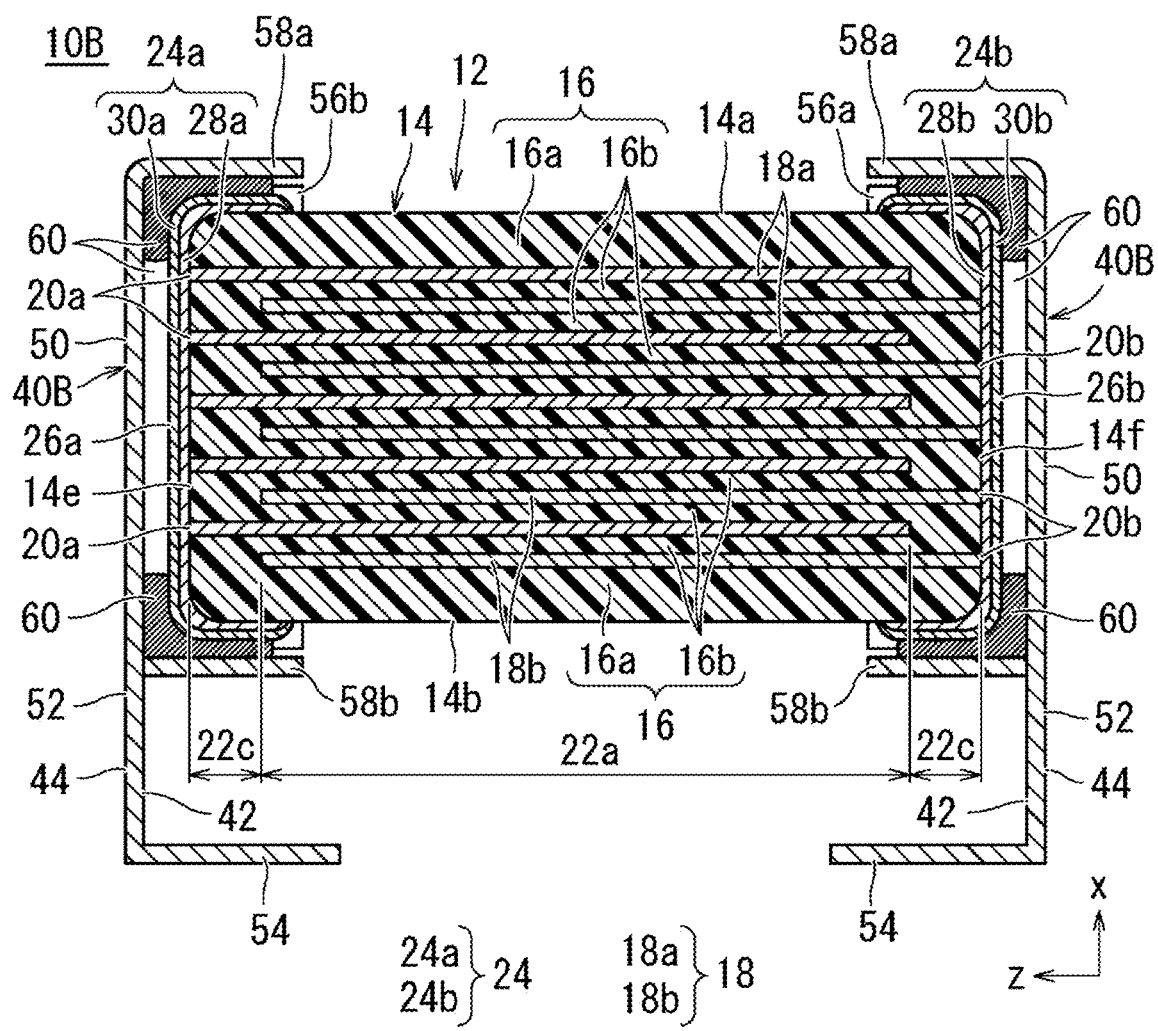
FIG. 7 is a cross-sectional view taken along the line VII-VII in FIG. 6 showing the multilayer ceramic electronic component according to the second preferred embodiment of the present invention.
Figure 8:
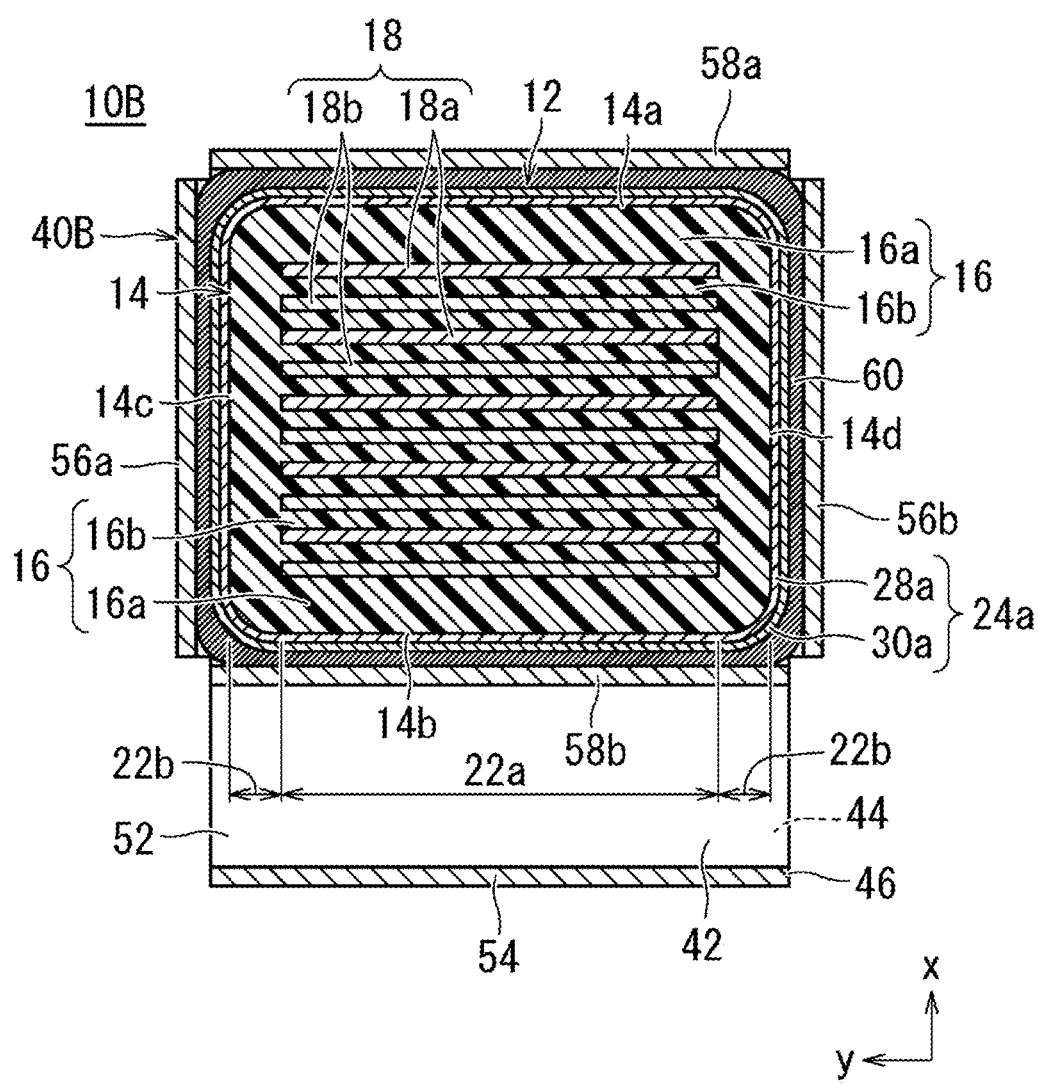
FIG. 8 is a cross-sectional view taken along the line VIII-VIII in FIG. 6 showing the multilayer ceramic electronic component according to the second preferred embodiment of the present invention.
Figure 9:
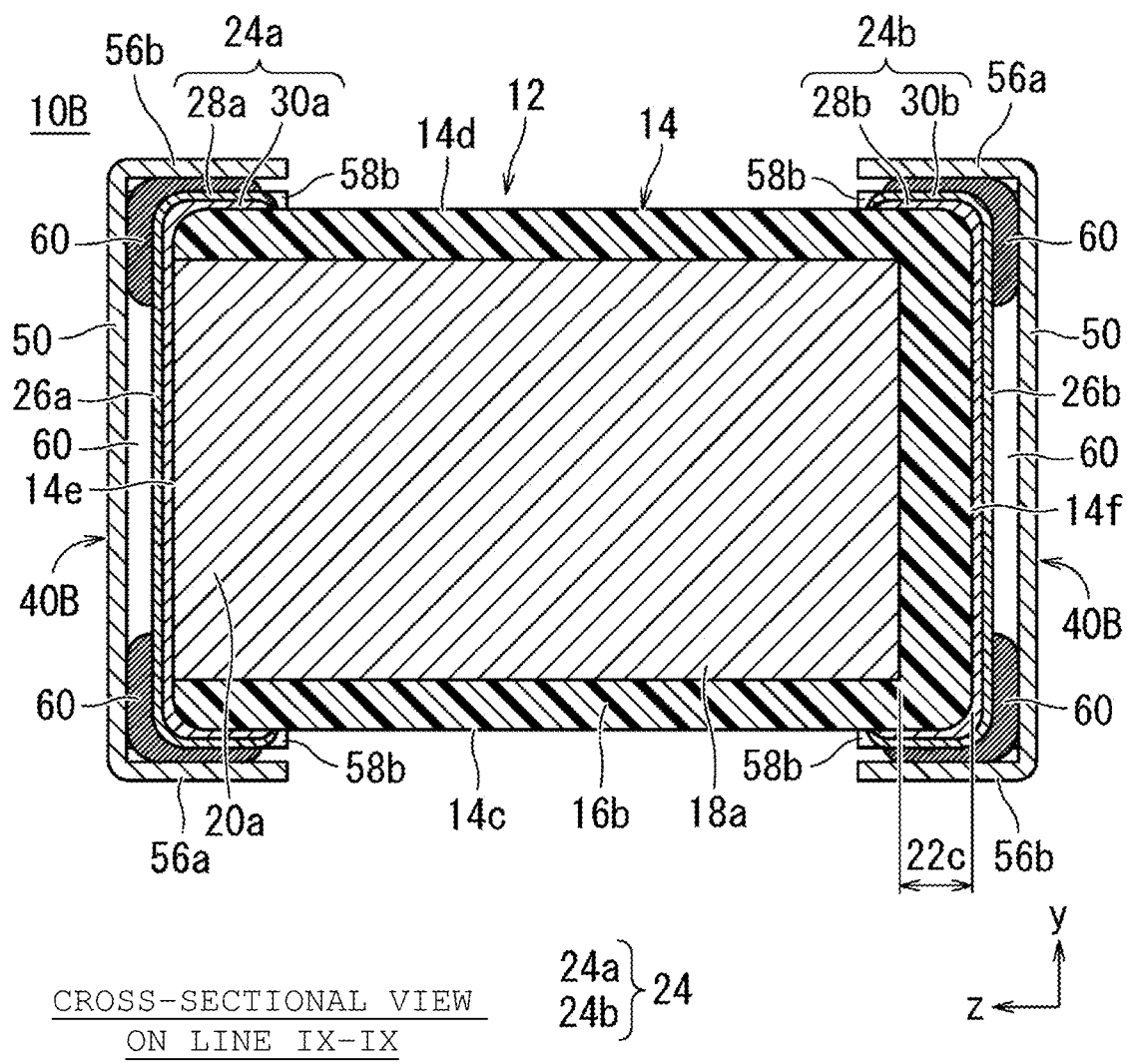
FIG. 9 is a cross-sectional view taken along the line IX-IX in FIG. 6 showing the multilayer ceramic electronic component according to the second preferred embodiment of the present invention.
Figure 10:
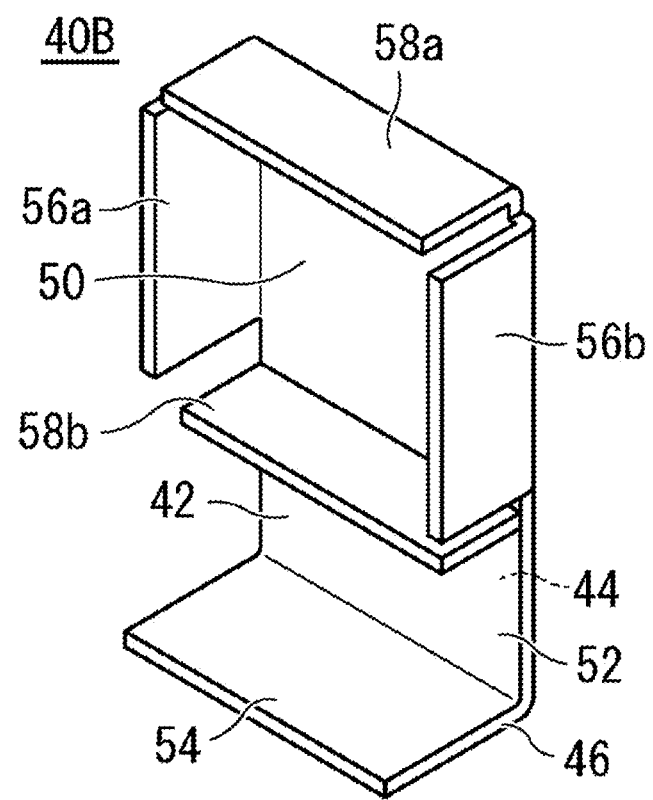
FIG. 10 is a perspective view of an external appearance showing a metal terminal included in the multilayer ceramic electronic component according to the second preferred embodiment of the present invention.

A multilayer ceramic electronic component according to a second preferred embodiment of the present invention will be described below. FIG. 6 is a perspective view of an external appearance showing an example of a multilayer ceramic electronic component according to the second preferred embodiment of the present invention. FIG. 7 is a cross-sectional view taken along the line VII-VII in FIG. 6 showing the multilayer ceramic electronic component according to the second preferred embodiment of the present invention, and FIG. 8 is a cross-sectional view taken along the line VIII-VIII in FIG. 6 showing the multilayer ceramic electronic component according to the second preferred embodiment of the present invention. FIG. 9 is a cross-sectional view taken along the line IX-IX in FIG. 6 showing the multilayer ceramic electronic component according to the second preferred embodiment of the present invention. FIG. 10 is a perspective view of an external appearance showing a metal terminal included in the multilayer ceramic electronic component according to the second preferred embodiment of the present invention. The multilayer ceramic electronic component 10B according to this preferred embodiment has the same or substantially the same configuration as the multilayer ceramic electronic component 10A described with reference to FIG. 1, except that the configuration of a pair of metal terminals 40B is different from that of the pair of metal terminals 40A. Therefore, the same or corresponding portions as that of the multilayer ceramic electronic component 10A illustrated in FIG. 1 are denoted by the same reference numerals, and description thereof is omitted.

The metal terminals 40B in the multilayer ceramic electronic component 10B shown in FIG. 6 are different from the metal terminals 40A as shown in FIG. 1. Further, principal-surface ribs 58a, 58b that extend to be opposed to the principal surfaces 14a, 14b, respectively, of the electronic component body 12 are provided on the terminal body 50. Specifically, the principal-surface rib 58a of the metal terminal 40B extends in the direction connecting the first end surface 14e and the second end surface 14f of the laminate 14 from the upper end portion of the terminal body 50 in the laminating direction x. In addition, the principal-surface rib 58b of the metal terminal 40B extends in the direction connecting the first end surface 14e and the second end surface 14f of the laminate 14 from the lower end portion of the terminal body 50 in the laminating direction x. The principal-surface ribs 58a, 58b of the metal terminal 40B preferably have a length in the length direction z (a length in a direction extending in the direction connecting the first end surface 14e and the second end surface 14f) longer than the length in the length direction z of the external electrode 24 that is provided on each of the surfaces of both principal surfaces 14a, 14b of the laminate 14. In other words, the principal-surface ribs 58a, 58b of the metal terminal 40A preferably cover the external electrode 24 provided on the surfaces of both principal surfaces 14a, 14b of the laminate 14.

The first external electrode 24a and one metal terminal 40B are bonded with the bonding material 60, and the second external electrode 24b and the other metal terminal 40B are bonded with the bonding material 60.

The bonding material 60 is provided between the side-surface ribs 56a, 56b of one metal terminal 40B and the first external electrode 24a (the first external electrode 24a on both side surfaces 14c, 14d) opposed to the side-surface ribs 56a, 56b. In addition, the bonding material 60 is provided between the principal-surface ribs 58a, 58b of one metal terminal 40B and the first external electrode 24a (the first external electrode 24a on both principal surfaces 14a, 14b) opposed to the principal-surface ribs 58a, 58b. Further, the bonding material 60 is not provided between the terminal body 50 of one metal terminal 40B and the end surface center portion 26a of the first external electrode 24a. Similarly, the bonding material 60 is provided between the side-surface ribs 56a, 56b of the other metal terminal 40B and the second external electrode 24b (the second external electrode 24b on both side surfaces 14c, 14d) opposed to the side-surface ribs 56a, 56b. In addition, the bonding material 60 is provided between the principal-surface ribs 58a, 58b of the other metal terminal 40B and the second external electrode 24b (the second external electrode 24b on both principal surfaces 14a, 14b) opposed to the principal-surface ribs 58a, 58b. Further, the bonding material 60 is not provided between the terminal body 50 of the other metal terminal 40B and the end surface center portion 26b of the second external electrode 24b.

The bonding material 60 is preferably disposed over a portion of the surface of the first external electrode 24a disposed on the first end surface 14e side of the laminate 14 from the first external electrode 24a opposed to the side-surface ribs 56a, 56b of one metal terminal 40B, and is further preferably disposed over a portion of the surface of the first external electrode 24a disposed on the first end surface 14e side of the laminate 14 from the first external electrode 24a opposed to the principal-surface ribs 58a, 58b of the other metal terminal 40B.

The bonding material 60 is preferably disposed over a portion of the surface of the second external electrode 24b disposed on the second end surface 14f side of the laminate 14 from the second external electrode 24b opposed to the side-surface ribs 56a, 56b of the other metal terminal 40B, and is further preferably disposed over a portion of the surface of the second external electrode 24b disposed on the second end surface 14f side of the laminate 14 from the second external electrode 24b opposed to the principal-surface ribs 58a, 58b of the other metal terminal 40B.

Further, the bonding material 60 is preferably disposed over a portion of the surfaces of the first side surface 14c and the second side surface 14d of the laminate 14 from the first external electrode 24a opposed to the side-surface ribs 56a, 56b of one metal terminal 40B (not shown). Further, the bonding material 60 is preferably disposed over a portion of the surfaces of the first principal surface 14a and the second principal surface 14b of the laminate 14 from the first external electrode 24a opposed to the principal-surface ribs 58a, 58b of one metal terminal 40B (not shown). Thus, the bonding strength between one metal terminal 40B and the first external electrode 24a is further increased.

The bonding material 60 is preferably disposed over a portion of the surfaces of the first side surface 14c and the second side surface 14d of the laminate 14 from the second external electrode 24b opposed to the side-surface ribs 56a, 56b of the other metal terminal 40B (not shown). Further, the bonding material 60 is preferably disposed over a portion of the surfaces of the first principal surface 14a and the second principal surface 14b of the laminate 14 from the second external electrode 24b opposed to the principal-surface ribs 58a, 58b of the other metal terminal 40B (not shown). Thus, the bonding strength between the other metal terminal 40B and the second external electrode 24b is further increased.

As in the multilayer ceramic electronic component 10A, the multilayer ceramic electronic component including the metal terminal 40B achieves not only the advantageous functions and effects that are similar to those of the metal terminal 40A shown in FIG. 5, but also the following advantageous functions and effects.

Since the side-surface ribs 56a, 56b that extend so as to be opposed to the side surfaces 14c, 14d, respectively, of the electronic component body 12 are provided on the terminal body 50 of the metal terminal 40B, the principal-surface ribs 58a, 58b that extend so as to be opposed to the principal surfaces 14a, 14b, respectively, of the electronic component body 12 are further provided, the bonding material 60 that is provided between the side-surface ribs 56a, 56b of one metal terminal 40B and the first external electrode 24a (the first external electrode 24a on both side surfaces 14c, 14d) is used for bonding, the bonding material 60 that is provided between the principal-surface ribs 58a, 58b of one metal terminal 40B and the first external electrode 24a (the first external electrode 24a on both principal surfaces 14a, 14b) is used for bonding, further, the bonding material 60 is not provided between the terminal body 50 of one metal terminal 40B and the end surface center portion 26a of the first external electrode 24a, similarly, the bonding material 60 that is provided between the side-surface ribs 56a, 56b of the other metal terminal 40B and the second external electrode 24b (the second external electrode 24b on both side surfaces 14c, 14d) is used for bonding, the bonding material 60 that is provided between the principal-surface ribs 58a, 58b of the other metal terminal 40B and the second external electrode 24b (the second external electrode 24b on both principal surfaces 14a, 14b) is used for bonding, and further, the bonding material 60 is not provided between the terminal body 50 of the other metal terminal 40B and the end surface center portion 26b of the second external electrode 24b, the bonding material 60 further ensures sufficient strength against stress (tensile stress) generated in the direction connecting the two metal terminals 40B.

2. Method for Manufacturing a Multilayer Ceramic Electronic Component

Next, an example of a preferred embodiment of a method for manufacturing the multilayer ceramic electronic component including the above-described configuration will be described as an example of the multilayer ceramic electronic component 10A.

First, a ceramic green sheet, a conductive paste for internal electrodes defining the internal electrode layer 18, and a conductive paste for external electrodes defining the external electrode 24 are prepared. The ceramic green sheet, the conductive paste for internal electrodes, and the conductive paste for external electrodes preferably include an organic binder and a solvent, for example, and known organic binders and organic solvents may be used.

Then, the conductive paste for internal electrodes is applied to the ceramic green sheet in a predetermined pattern, for example, to form an internal electrode pattern on the ceramic green sheet. The conductive paste for internal electrodes may be printed by a known method, such as screen printing or gravure printing, for example.

Next, a predetermined number of ceramic green sheets for outer layers without an internal electrode pattern printed thereon are laminated, the ceramic green sheets with an internal electrode pattern printed thereon are sequentially laminated on the ceramic green sheets for outer layers, and a predetermined number of ceramic green sheets for outer layers are further laminated thereon, so that a multilayer sheet is produced. Subsequently, the multilayer sheet is pressure-bonded in the laminating direction x by, for example, isostatic press or other suitable press to produce a multilayer block.

Thereafter, the multilayer block is cut into a predetermined shape and size, and a green multilayer chip is cut out. At this time, barrel polishing or other suitable polishing, for example, may be applied to the green multilayer chip to round corners and ridges thereof. Subsequently, the cut out green multilayer chip is fired to produce the laminate 14. The firing temperature of the green multilayer chip depends on the materials of the ceramic and the conductive paste for internal electrodes, and is preferably in the range of about 900° C. or higher and about 1300° C. or lower, for example.

Next, to form a baked layer of the external electrode 24, for example, a conductive paste for external electrodes is applied to an exposed portion of the first extended electrode portion 20a of the first internal electrode 18a that is exposed to the surface of the laminate 14 from the first end surface 14e, and then baked. Similarly, to form a baked layer of the external electrode 24, for example, a conductive paste for external electrodes is applied to an exposed portion of the second extended electrode portion 20b of the second internal electrode 18b that is exposed from the second end surface 14f of the laminate 14, and then baked, so that a baked layer is formed. The baking temperature at this time is preferably in the range of about 700° C. or more and about 900° C. or less, for example. If necessary, a plating layer including at least one layer is formed on the surface of the baked layer, the external electrode 24 is formed, and the electronic component body 12 is manufactured.

Subsequently, a step of attaching metal terminals in the method for manufacturing the multilayer ceramic electronic component according to an example of a preferred embodiment of the present invention will be described.

First, a pair of metal terminals 40A are prepared.

Next, one metal terminal 40A is attached to the first external electrode 24a of the electronic component body 12 with the bonding material 60. At this time, the bonding material 60 is not provided between the terminal body 50 of one metal terminal 40A and the end surface center portion 26a of the first external electrode 24a. Similarly, the other metal terminal 40A is attached to the second external electrode 24b of the electronic component body 12 with the bonding material 60. At this time, the bonding material 60 is not provided between the terminal body 50 of the other metal terminal 40A and the end surface center portion 26b of the second external electrode 24b.

As the bonding material 60, for example, a conductive adhesive in which conductive powders, such as metal powders, are added to a solder or a resin component, such as silicon resin or epoxy resin, for example, may preferably be used. In particular, for example, a conductive material having the following characteristics is preferably used for connection.

The conductive material contains a metal component including a first metal, and a second metal that has a higher melting point than the first metal and is allowed to react with the first metal to form an intermetallic compound. The first metal of the conductive material is Sn or an alloy containing about 70% by mass of Sn, and the second metal thereof is Cu or at least one selected from a Cu—Mn alloy, a Cu—Ni alloy, a Cu—Al alloy, and a Cu—Cr alloy. The first and second metals of the conductive material form an intermetallic compound having a melting point of about 310° C. or higher. The conductive material also includes materials (e.g., metals such as Ag, Au, etc.) which easily wet the first metal melted as the second metal, and which have surfaces coated with a metal or an alloy which does not reduce or prevent the reaction between the first metal and the second metal by diffusing in the first metal without remaining on its surface.

Preferably, for example, the bonding material 60 (bonding portion) includes a metal, an alloy, an intermetallic compound, and Sn or a Sn-based alloy, having a melting point of about 260° C. or higher, or includes a Cu-M (M is Ni, Mn, Al, or Cr) alloy, an intermetallic compound including at least two kinds of Cu, Ni, Mn, Al, Cr, Sn, Au, Ag, Sb, Zn, Bi, and the like, and Sn, and a Sn ratio in the bonding material 60 is about 5% or less.

The remaining Sn ratio is controlled by adjusting the amount of a low melting point metal component, the amount of an activator, and heating conditions.

As described above, the multilayer ceramic electronic component 10A shown in FIG. 1 is manufactured.

3. Experimental Examples

Next, regarding the multilayer ceramic electronic components 10A, 10B according to the first and second preferred embodiments of the present invention, an experiment was conducted to evaluate the peel strength of the metal terminals.

First, as for samples used in the experiment, samples of Examples 1 and 2 were prepared as examples. A sample of a Comparative Example 1 was prepared as a comparative example. Five samples of each of the Examples 1 and 2 and the Comparative Example 1 were prepared.

First, according to the method for manufacturing the multilayer ceramic electronic component described above, an electronic component body (a multilayer ceramic capacitor) having the following specifications was prepared.

Chip size (design value): Length×width×height=about 5.0 mm×about 5.0 mm×about 2.7 mm
  Material of ceramic layer: $BaTiO_3$
  Capacity: about 17 μF
  Rated voltage: DC 35V
  Structure of external electrode: Structure including a base electrode layer (a baked layer) and a plating layer
  Material of base electrode layer (baked layer): Electrode including a conductive metal (Cu) and a glass component
  Thickness of base electrode layer: about 100 μm at the end surface center portion
  Plating layer: A bilayer structure of a Ni plating (thickness: about 3 μm or more and about 6 μm or less) and a Sn plating (about 3 μm or more and about 6 μm or less)

In Example 1, a pair of metal terminals that were bonded to the electronic component body were metal terminals 40A of the first preferred embodiment. The specifications of the metal terminals 40A are as follows.
  Structure of metal terminal: A terminal body, an extension portion, and a mounting portion are provided, and the terminal body includes side-surface ribs.
  Metal terminal: A bilayer structure of a terminal body and a plating film
    Terminal body: Cu-based material (Cu-8Sn alloy)
    Plating film: A bilayer structure of a Ni plating film (thickness: about 1 μm or more and about 2 μm or less) and a Sn plating film (about 2 μm or more and about 4 μm or less)
  Length of extension portion: about 1 mm
  Material of bonding material: Sn-10Sb alloy
  Structure of bonding material: The bonding material is present between the side-surface ribs and the external electrode opposed to the side-surface ribs, and is not present between the terminal body of the metal terminal and the end surface center portion of the external electrode.

The metal terminal was bonded to the electronic component body in the following manner. First, the bonding material was applied only to the side-surface ribs of the metal terminals using a dispenser. Thereafter, one metal terminal was reflow-bonded on the first end surface side of the electronic component body with the electronic component body standing upright. Similarly, the other metal terminal was reflow-bonded on the second end surface side of the electronic component body.

In Example 2, a pair of metal terminals that were bonded to the electronic component body thus prepared were metal terminals 40B of the second preferred embodiment. The specifications of the metal terminals 40B are as follows.
  Structure of metal terminal: A terminal body, an extension portion, and a mounting portion are provided, and the terminal body includes side-surface ribs and principal-surface ribs.
  Metal terminal: A bilayer structure of a terminal body and a plating film
    Terminal body: Cu-based material (Cu-8Sn)
    Plating film: A bilayer structure of a Ni plating film (thickness: about 1 μm or more and about 2 μm or less) and a Sn plating film (about 2 μm or more and about 4 μm or less)
  Length of extension portion: about 1 mm
  Material of bonding material: Sn-10Sb alloy
  Structure of bonding material: The bonding material is present between the side-surface ribs and the external electrode opposed to the side-surface ribs, present between the principal-surface ribs and the external electrode opposed to the principal-surface ribs, and is not present between the terminal body of the metal terminal and the end surface center portion of the external electrode.

The metal terminal was bonded to the electronic component body in the following manner. First, the bonding material was applied only to the side-surface ribs and the principal-surface ribs of the metal terminals using a dispenser. Thereafter, one metal terminal was reflow-bonded on the first end surface side of the electronic component body with the electronic component body standing upright. Similarly, the other metal terminal was reflow-bonded on the second end surface side of the electronic component body.

Figure 13:
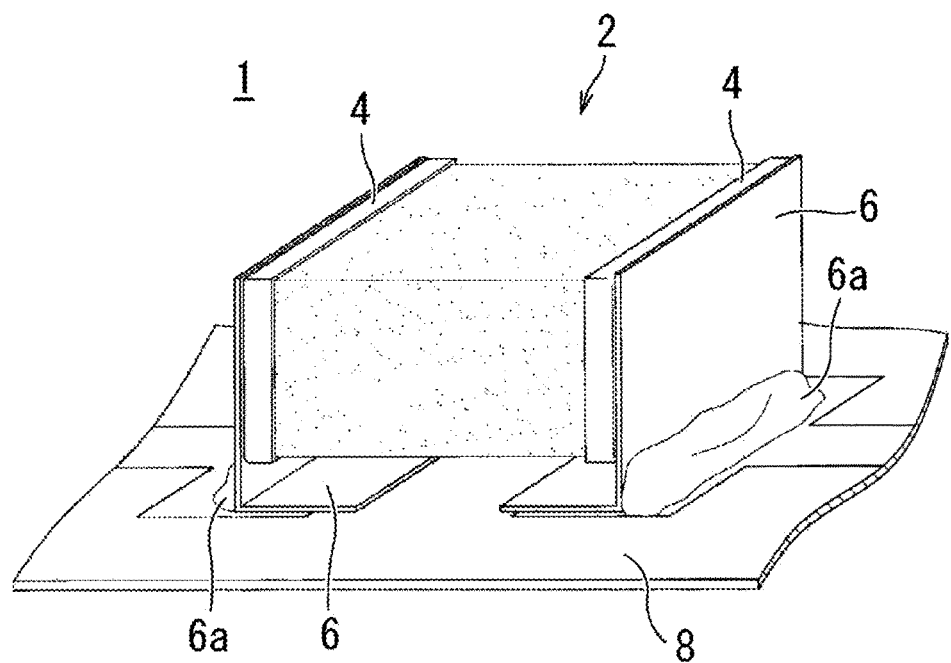
FIG. 13 is a perspective view of an external appearance showing a multilayer ceramic electronic component including a conventional multilayer ceramic capacitor.

The metal terminal used in the multilayer ceramic electronic component of the comparative example was a conventional metal terminal as shown in FIG. 13, and simply included a terminal body, an extension portion, and a mounting portion, but did not include a side-surface rib and a principal-surface rib. Then, the bonding material was provided on the entire end surface of the electronic component body, and the terminal body of the metal terminal and the external electrode was connected through the bonding material. The other structure of the metal terminal was the same as those of Examples 1 and 2.

Method for Preparing a Mounting Body for Evaluation

As the mounting substrate, a solder paste of Sn-10Sb alloy was applied onto the Cu electrode of the alumina substrate, and the multilayer ceramic electronic component with the metal terminals attached thereto was mounted. The alumina substrate had a size of about 15 mm×about 8 mm, a thickness of about 635 μm, and the Cu electrode had a thickness of about 35 μm.

Method for Evaluating Peel Strength

Figure 11A:
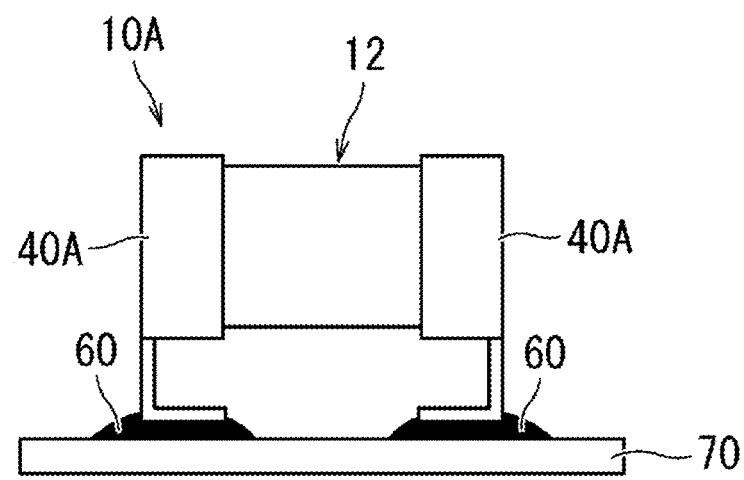
FIGS. 11A and 11B show preparation steps for evaluation of a peel strength test.
Figure 11B:
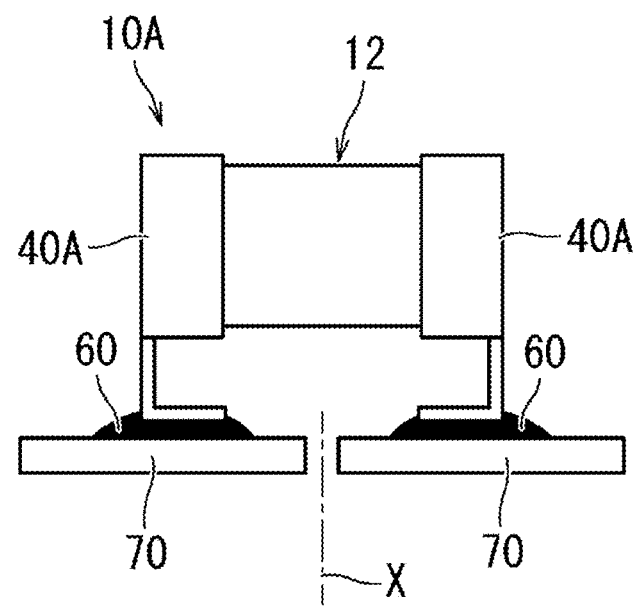

FIGS. 11A, 11B, 12A, and 12B show a schematic view of the method for evaluating a peel strength test. FIGS. 11A and 11B show preparation steps for evaluation of the peel strength test; FIG. 11A shows a state in which the multilayer ceramic electronic component is mounted on a mounting substrate; and FIG. 11B shows a state in which the mounting substrate is cut into right and left portions. FIGS. 12A and 12B show performance steps for evaluation of the peel strength test; FIG. 12A shows a state in which both ends of the mounting substrate are held with jigs (a fixing jig and a tensile jig); and FIG. 12B shows a state in which the mounting substrate is pulled with the tensile jig.

Here, the case where the peel strength test was conducted with the sample of example 1 will be described.

First, as shown in FIG. 11A, the multilayer ceramic electronic component 10A used as a sample was mounted on a mounting substrate 70 with the bonding material 60. Then, as shown in FIG. 11B, the mounting substrate 70 located in the lower portion of the multilayer ceramic electronic component 10A of the sample was cut along a cutting line X with a wire saw.

Subsequently, as shown in FIG. 12A, one end side of the mounting substrate 70 was fixed with a fixing jig 72a, the other end side of the mounting substrate 70 was fixed with a tensile jig 72b, and the tensile jig 72b was pulled upward (in a direction of an arrow F). Then, as shown in FIG. 12B, the tensile jig 72b was pulled upward until the metal terminal 40A was detached from the electronic component body 12, and an average of the maximum strength at the time when the metal terminal 40A was detached was evaluated as peel strength. A tensile speed of the tensile jig 72b was about 0.5 mm/sec.

The peel strength test was also conducted with the samples of Example 2 and Comparative Example 1 in the same manner as described above.

Table 1 shows the experimental results of the evaluation of the peel strength of the metal terminal as described above.

TABLE 1

|  | Bonding material | Peel strength (N) |
|---|---|---|
| Comparative Example 1 | Sn—10Sb alloy | 30 |
| Example 1 | Sn—10Sb alloy | 44.9 |
| Example 2 | Sn—10Sb alloy | 90 |

As the sample of Comparative Example 1, a metal terminal without a side-surface rib or a principal-surface rib was used, and the peel strength obtained using this sample was about 30 N.

The sample of Example 1 included side-surface ribs provided on the metal terminal, the metal terminal and the external electrode were bonded between the side-surface ribs and the external electrode (the external electrode on the side surface) using the bonding material, and the bonding material was not provided between the terminal body and the end surface center portion of the external electrode. Therefore, the sample had a peel strength of about 44.9 N and had better strength than that of Comparative Example 1. With the arrangement of the sample of Example 1, it was confirmed that even the bonding material that was weak in tension ensured sufficient strength against stress (tensile stress) generated in the direction connecting the two metal terminals by acting as shearing force that had relatively high strength.

Further, the sample of Example 2 included not only side-surface ribs but also principal-surface ribs provided on the metal terminal, the metal terminal and the external electrode were bonded between the side-surface ribs and the external electrode (the external electrode on the side surface) and between the principal-surface ribs and the external electrode (the external electrode on the principal surface) with the bonding material, and the bonding material was not provided between the terminal body and the end surface center portion of the external electrode. Therefore, the sample had a peel strength of about 90 N and had better strength than those of Comparative Example 1 and Example 1.

Further, the bonding portion between the external electrode and the metal terminal in each sample includes about 5% or less of Sn that causes diffusion, a metal and an intermetallic compound, having a melting point of about 260° C. or higher, so that a diffused metal species is substantially not present therein and variations in the interface structure is small under a high temperature environment at about 200° C. or higher. Therefore, it was confirmed that a problem was able to be prevented that, even under a high temperature environment, the bonding strength between the external electrode and the metal terminal decreased over time, causing a structural defect, such as a crack, in the bonding portion of the external electrode and the metal terminal.

It is to be understood that the present invention is not limited to the preferred embodiments described above, and it may be modified in various ways within the scope of the present invention. The thickness, the number of layers, the area of the opposed electrode, and the external dimension of the ceramic layer in the electronic component body may not be limited to the preferred embodiments described above.

The metal terminals 40A and 40B according to the first and second preferred embodiments include, but are not limited to, the side-surface ribs 56a, 56b provided thereon, and the principal-surface ribs 58a, 58b alone may be provided on the metal terminals.

Further, the multilayer ceramic electronic components 10A and 10B according to the first and second preferred embodiments include, but are not limited to, only one electronic component body 12, and two or more electronic component bodies 12 may be stacked in layers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic electronic component comprising:
a laminate including a plurality of dielectric layers and a plurality of internal electrode layers alternately stacked, a first principal surface and a second principal surface that are opposite to each other in a laminating direction, a first side surface and a second side surface that are opposite to each other in a width direction orthogonal or substantially orthogonal to the laminating direction, and a first end surface and a second end surface that are opposite to each other in a length direction orthogonal or substantially orthogonal to both of the laminating direction and the width direction;
an electronic component body including a first external electrode connected to the first end surface of the laminate and a second external electrode connected to the second end surface of the laminate;
a first metal terminal connected to the first external electrode through a bonding material; and
a second metal terminal connected to the second external electrode through a bonding material; wherein
the first metal terminal includes a terminal body opposed to the first end surface, an extension portion connected to the terminal body and extending in a direction of a mounting surface, and a mounting portion connected to the extension portion and extending from the extension portion in a direction connecting the end surfaces;
the second metal terminal includes a terminal body opposed to the second end surface, an extension portion connected to the terminal body and extending in the direction of the mounting surface, and the mounting portion connected to the extension portion and extending from the extension portion in the direction connecting the end surfaces;

in the first metal terminal and the second metal terminal:
the extension portion provides a gap between a lower surface of the electronic component body and the mounting portion; and
a rib opposed to a respective side surface of the electronic component body is provided on the terminal body;

the bonding material is provided between the rib of the first metal terminal and the first external electrode opposed to the rib, and not provided between the terminal body and an end surface center portion of the first external electrode; and the bonding material is provided between the rib of the second metal terminal and the second external electrode opposed to the rib, and not provided between the terminal body and an end surface center portion of the second external electrode.

2. The multilayer ceramic electronic component according to claim 1, further comprising a rib opposed to a principal surface of the electronic component body in the terminal bodies of the first metal terminal and the second metal terminal.

3. The multilayer ceramic electronic component according to claim 1, wherein
the bonding material includes a Cu-M alloy, where M is Ni, Mn, Al, or Cr, an intermetallic compound including at least two of Cu, Ni, Mn, Al, Cr, Sn, Au, Ag, Sb, Zn, and Bi; and Sn; and
a Sn ratio in the bonding material is about 5% or less.

4. The multilayer ceramic electronic component according to claim 1, wherein
the bonding material extends to a surface of the laminate from the first external electrode opposed to the rib of the first metal terminal; and
the bonding material extends to a surface of the laminate from the first external electrode opposed to the rib of the second metal terminal.

5. The multilayer ceramic electronic component according to claim 1, wherein
the laminate includes an inner layer portion and outer layer portions sandwiching the inner layer portion;
each of the outer layer portions is located between a respective one of the first and second principal surfaces and an internal electrode layer of the plurality of internal electrode layers closest to the respective one of the first and second principal surfaces.

6. The multilayer ceramic electronic component according to claim 1, wherein each of the plurality of dielectric layers includes at least one of $BaTiO_3$, $CaTiO_3$, $SrTiO_3$, and $CaZrO_3$ as a main component.

7. The multilayer ceramic electronic component according to claim 6, wherein the plurality of dielectric layers further include at least one of a Mn compound, a Fe compound, an Cr compound, a Co compound, or a Ni compound with a content less than the main component.

8. The multilayer ceramic electronic component according to claim 1, wherein the plurality of internal electrode layers are perpendicular or substantially perpendicular to a direction in which the first and second metal terminals extend.

9. The multilayer ceramic electronic component according to claim 1, wherein the plurality of internal electrode layers are parallel or substantially parallel to the mounting surface.

10. The multilayer ceramic electronic component according to claim 1, wherein
the plurality of internal electrode layers include first internal electrode layers and second internal electrode layers;
the laminate includes an opposed electrode portion in which the first and second internal electrode layers oppose each other, and side portions between one end of the opposed electrode portion in the width direction and the first side surface and between another end of the opposed electrode portion in the width direction and the second side surface.

11. The multilayer ceramic electronic component according to claim 1, wherein each of the plurality of internal electrode layers contains at least one of Ni, Cu, Ag, Pd, and Au, or an alloy including at least one of Ni, Cu, Ag, Pd, or Au.

12. The multilayer ceramic electronic component according to claim 1, wherein each of the plurality of internal electrode layers has a thickness of about 0.1 μm or more and about 2 μm or less.

13. The multilayer ceramic electronic component according to claim 1, wherein
the first external electrode includes a first base electrode layer and a first plating layer disposed on the first base electrode layer; and
the second external electrode includes a second base electrode layer and a second plating layer disposed on the first base electrode layer.

14. The multilayer ceramic electronic component according to claim 13, wherein
the first base electrode layer is disposed on the first end surface of the laminate and extends to cover a portion of each of the first and second principal surfaces and the first and second side surfaces of the laminate; and
the second base electrode layer is disposed on the second end surface of the laminate and extends to cover a portion of each of the first and second principal surfaces and the first and second side surfaces of the laminate.

15. The multilayer ceramic electronic component according to claim 13, wherein each of the first and second base electrode layers includes at least one of a baked layer and a thin film layer.

16. The multilayer ceramic electronic component according to claim 15, wherein the baked layer includes glass and metal.

17. The multilayer ceramic electronic component according to claim 16, wherein the metal includes at least one of Cu, Ni, Ag, Pb, Ag—Pb alloy, and Au.

18. The multilayer ceramic electronic component according to claim 16, wherein the glass includes at least one of B, Si, Ba, Mg, Al, Li, and Zn.

19. The multilayer ceramic electronic component according to claim 13, wherein each of the first and second plating layers includes at least one of Cu, Ni, Sn, Ag, Pd, Ag—Pd alloy, and Au, or an alloy containing at least one of Cu, Ni, Sn, Ag, Pd, Ag—Pd alloy, and Au.

20. The multilayer ceramic electronic component according to claim 13, wherein
each of the first and second plating layers includes a Ni plating layer and a Sn plating layer;
the Ni plating layer covers a respective one of the first and second base electrode layers; and
the Sn plating layer covers the Ni plating layer.

* * * * *